United States Patent
Li et al.

(10) Patent No.: US 12,324,058 B2
(45) Date of Patent: Jun. 3, 2025

(54) CORE NETWORK ASSISTED SERVICE DISCOVERY

(71) Applicant: InterDigital Patent Holdings, Inc., Wilmington, DE (US)

(72) Inventors: Hongkun Li, Malvern, PA (US); Michael F. Starsinic, Newtown, PA (US); Rocco Di Girolamo, Laval (CA); Catalina Mihaela Mladin, Hatboro, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 183 days.

(21) Appl. No.: 18/132,598

(22) Filed: Apr. 10, 2023

(65) Prior Publication Data

US 2023/0328512 A1    Oct. 12, 2023

Related U.S. Application Data

(63) Continuation of application No. 17/258,237, filed as application No. PCT/US2019/040983 on Jul. 9, 2019, now abandoned.

(60) Provisional application No. 62/695,280, filed on Jul. 9, 2018.

(51) Int. Cl.
| | |
|---|---|
| *H04W 8/24* | (2009.01) |
| *H04W 8/28* | (2009.01) |
| *H04W 48/16* | (2009.01) |
| *H04W 76/25* | (2018.01) |
| *H04W 84/04* | (2009.01) |

(52) U.S. Cl.
CPC ............ *H04W 8/24* (2013.01); *H04W 8/28* (2013.01); *H04W 48/16* (2013.01); *H04W 76/25* (2018.02); *H04W 84/042* (2013.01)

(58) Field of Classification Search
CPC ......... H04W 8/24; H04W 8/28; H04W 48/16; H04W 76/25; H04W 84/042; H04W 8/00; H04W 4/70; H04W 76/10; H04W 4/50; H04L 67/51
See application file for complete search history.

(56) References Cited

U.S. PATENT DOCUMENTS

| | | | |
|---|---|---|---|
| 2013/0107702 | A1 | 5/2013 | Gupta et al. |
| 2015/0263839 | A1 | 9/2015 | He et al. |
| 2017/0289019 | A1 | 10/2017 | Faccin et al. |
| 2017/0311112 | A1* | 10/2017 | Seed ................... H04L 67/51 |
| 2018/0192390 | A1 | 7/2018 | Li et al. |

FOREIGN PATENT DOCUMENTS

| | | |
|---|---|---|
| CN | 102907068 A | 1/2013 |
| CN | 103281688 A | 9/2013 |
| CN | 104221410 A | 12/2014 |

(Continued)

OTHER PUBLICATIONS

3GPP TR 23.799, Study on Architecture for Next Generation System, (Release 14), V0.1.0, Nov. 2015, pp. 1-8.

(Continued)

*Primary Examiner* — Ankur Jain
(74) *Attorney, Agent, or Firm* — Flaster Greenberg P.C.

(57) ABSTRACT

Methods and apparatus are disclosed for integrating NF discovery and application layer service capability discovery in a communications network, such as the 3GPP NR (e.g., 5G) network.

20 Claims, 21 Drawing Sheets

(56) References Cited

FOREIGN PATENT DOCUMENTS

| KR | 10-2017-0119296 A | 10/2017 |
|---|---|---|
| WO | 2018/067780 A1 | 4/2018 |

OTHER PUBLICATIONS

3GPP TS 22.261, Service requirements for the 5G system; Stage 1; V16.2.0 (Release 16), Dec. 2017, pp. 1-53.

3GPP TS 23.041, Technical realization of Cell Broadcast Service (CBS), v14.1.0, Release 14, Jul. 2017, pp. 1-73.

3GPP TS 23.246: "Multimedia Broadcast/Multicast Service (MBMS); Architecture and functional description", Release 6, V0.1.0, Jun. 2002, pp. 1-7.

3GPP TS 23.501, System Architecture for the 5G System; Stage 2, v1.2.0, Release 15, Jul. 2017, pp. 1-166.

3GPP TS 23.682, Architecture enhancements to facilitate communications with packet data networks and applications, Release 15, v15.1.0, Jun. 2017, pp. 1-118.

3rd Generation Partnership Project, Technical Specification Group Services and System Aspects, Procedures for the 5G System, Stage 2 (Release 15), 3GPP Standard; Technical Specification, 3GPP Ts 23.502, 3rd Generation Partnership Project (3GPP), Mobile Competence Centre, 650, Route Des Lucioles, F-06921 Sophia-Antipolis Cedex, France, vol. SA WG2, No. V15.2.0, Jun. 19, 2018, pp. 1-308.

ETSI GS NFV 002, Network Functions Virtualization (NFV); Architectural Framework, Oct. 2013, pp. 1-21.

NGMN Alliance, "Description of Network Slicing Concept", www.ngmn.org/uploads/media/160113_Network_Slicing_v1_0.pdf, Jan. 2016, pp. 1-7.

OneM2M-TS-0001 oneM2M Functional Architecture—V2.3.0, Aug. 2015, pp. 1-352.

Nokia et al., "Network Slice access Subscription Management by a third party—message flow P-CR.", SA WG2 Meeting #122bis, S2-175694, Aug. 2017, pp. 1-12.

3rd Generation Partnership Project, "Technical Specification Group Core Network and Terminals; Non-Access-Stratum (NAS) protocol for 5G System (5GS); Stage 3 (Release 15)", 3GPP TS 24.501, V15.0.0, Jun. 15, 2018, 338 pages.

* cited by examiner

CORE NETWORK ASSISTED SERVICE DISCOVERY

CROSS-REFERENCE TO RELATED APPLICATIONS

This application is a continuation of U.S. patent application Ser. No. 17/258,237 filed Jan. 6, 2021 which is the National Stage of International Patent Application No. PCT/US2019/040983, filed Jul. 9, 2019, which claims the benefit of U.S. Provisional Patent Application No. 62/695,280, filed Jul. 9, 2018, which are hereby incorporated by reference in their entirety.

BACKGROUND

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G."

In current versions of the 3GPP NR specifications, the Core Network (CN) performs Network Function (NF) discovery in order to find one or more Network Functions to provide services requested by a User Equipment (UE). In a separate process, once a UE obtains network connectivity, Internet of Things (IoT) applications hosted on a UE will typically perform application layer service discovery in order to find IoT servers and applications (e.g., hosted on other UEs) that provide desired services. Presently, NF discovery and application layer service discovery are performed separately in the 5G network.

SUMMARY

Disclosed herein are methods and apparatus for integrating NF discovery and application layer service discovery in a communications network, such as the 3GPP NR (e.g., 5G) network.

In one aspect, a method is disclosed for a UE and application server to advertise their service capability within the core network to make the service capability discoverable.

In another aspect, a method is disclosed for a UE to initiate service discovery in the core network as part of a registration process. Alternatively, a method is disclosed for a UE to initiate service discovery as part of a PDU session establishment procedure.

In another aspect, a method is disclosed for a UE to subscribe to a certain service capability in the core network.

In yet another aspect, a method is disclosed for a server in the core network to initiate service discovery.

Also disclosed are new network services that may be provided by a Network Repository Function to enable service discovery in the core network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with accompanying drawings wherein.

DETAILED DESCRIPTION OF ILLUSTRATIVE EMBODIMENTS

Figure 1:
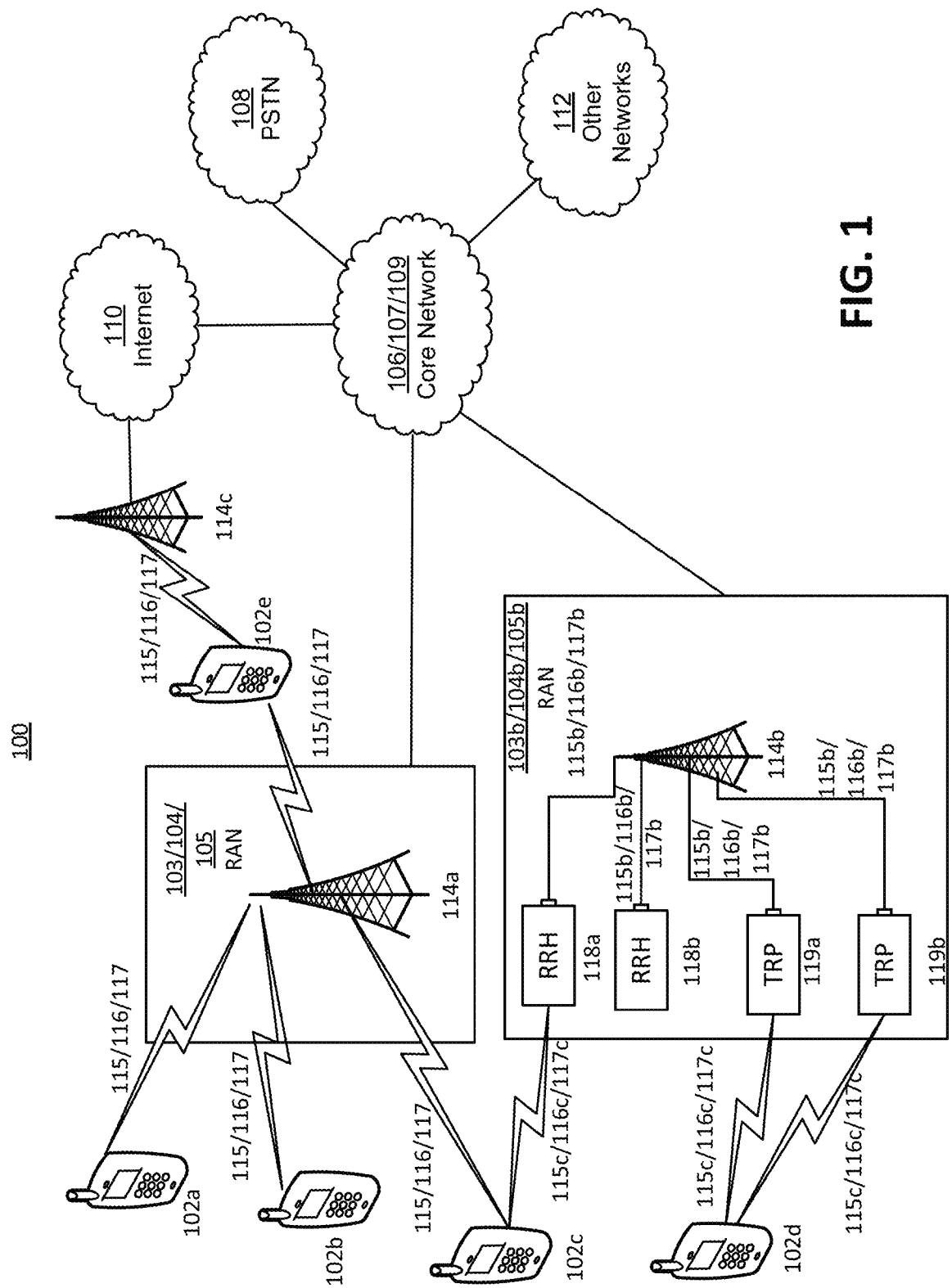
FIG. 1 illustrates an example communications system.

The following is a list of acronyms that may appear in the following description. Unless otherwise specified, the acronyms used herein refer to the corresponding terms listed below:
AF Application Function
AMF Access and Mobility Management Function
AS Application Server
AUSF Authentication Server Function
CM Connection Management
CN Core Network
CP Control Plane
DL Downlink
DNN Data Network Name
EPC Evolved Packet Core
EPS Evolved Packet System
FQDN Fully Qualified Domain Name
LTE Long Term Evolution
MME Mobility Management Entity
NAS Non Access Stratum
NRF NF Repository Function
NEF Network Exposure Function
NF Network Function
NIDD Non-IP Data Delivery
NSSF Network Slice Selection Function
NWDAF Network Data Analytics Function
PCF Policy Control Function
QoS Quality of Service
RAN Radio Access Network
SCS Service Capability Server
SCEF Service Capability Exposure Function
SMF Session Management Function
SMSF Short Message Service (SMS) Function
SPR Subscription Profile Repository
UDM/UDR Unified Data Management/Unified Data Repository
UDSF Unstructured Data Storage Function
UE User Equipment
UL Uplink
UPF User Plane Function The following terms may have the following meanings:

A "Network Function (NF)" may be a processing function in a network, which has defined functional behavior and defined interfaces. An NF can be implemented either as a network element on a dedicated hardware, or as a software instance running on a dedicated hardware, or as a virtualized function instantiated on an appropriate platform, e.g. on a cloud infrastructure.

A "Network Service" may be a service offered by a network function to another network function in the service based architecture. The services can be advertised to a NRF. For example, an AMF provides a Namf_EventExposure service, which enables AMF to send notification to NFs that subscribe to certain mobility management related events.

A "Device/SCS/AS Service" may refer to a higher layer (e.g., service layer or application layer) service, capability, or functionality offered by a device, service capability server, or application server. For example, an application server may provide a device management service.

A "PDU session" may be an association between a UE and a data network that provides a PDU Connectivity Service. There are at least two types of PDU sessions: (1) IP Type—i.e., the data network is an IP type; and (2) Non-IP type—the data network is non-IP.

A "UE Capability Profile" may describe what a UE is capable of doing. This profile is typically static. For example, if the UE has relay capabilities, the UE's category (e.g. maximum data rate), screen size, voice capable, IMS capable, GPS capable, etc. This information may be kept in the UE subscription configuration and/or SIM.

"Session Management in 3GPP CN" refers to session management in a 3GPP CN. In 3GPP CN, session management is to manage the end-to-end PDN connection (IP or non-IP type) between UE and packet data network for the data transfer through the core network with policy (e.g., QoS) and charging control enforced.

"Service Capability" refers to any type of service supported by a service layer of a communications network. Examples include device management, group management, service discovery, subscription/notification services, smart transportation service, environment monitoring, and the like.

"Core Network" refers to the central, or core, part of a telecommunication network, which offers numerous communication services to customers who are interconnected by the radio access network. A core network typically comprises a number of entities that perform the functionality of the core network. As used herein, the term "core network entity" refers to any entity that performs functionality of a core network, such as, for example, an AMF, UDR/UDSF, UDM/UDR, NRF, NEF, PCF, NF, SMF, AUSF, NSSF, or the like, as described herein. It is understood that such core network entities may be logical entities that are implemented in the form of software (i.e., computer-executable instructions) stored in a memory of, and executing on a processor of, an apparatus configured for wireless and/or network communications or a computer system such as those illustrated in FIG. 2 or FIG. 7.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G." 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that New Radio (NR) is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

FIG. 1 illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d, 102e may be any type of apparatus or device configured to operate and/or communicate in a wireless environment. Although each WTRU 102a, 102b, 102c, 102d, 102e is depicted in FIGS. 1-6 as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b and/or TRPs (Transmission and Reception Points) 119a, 119b to facilitate access to one or more communication networks, such as the core network 106/107/109, the Internet 110, and/or the other networks 112. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 1 may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet another embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 1, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 1, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105b or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 1 may be configured to communicate with the base station 114a, which may employ a cellular-based radio technology, and with the base station 114c, which may employ an IEEE 802 radio technology.

Figure 2:
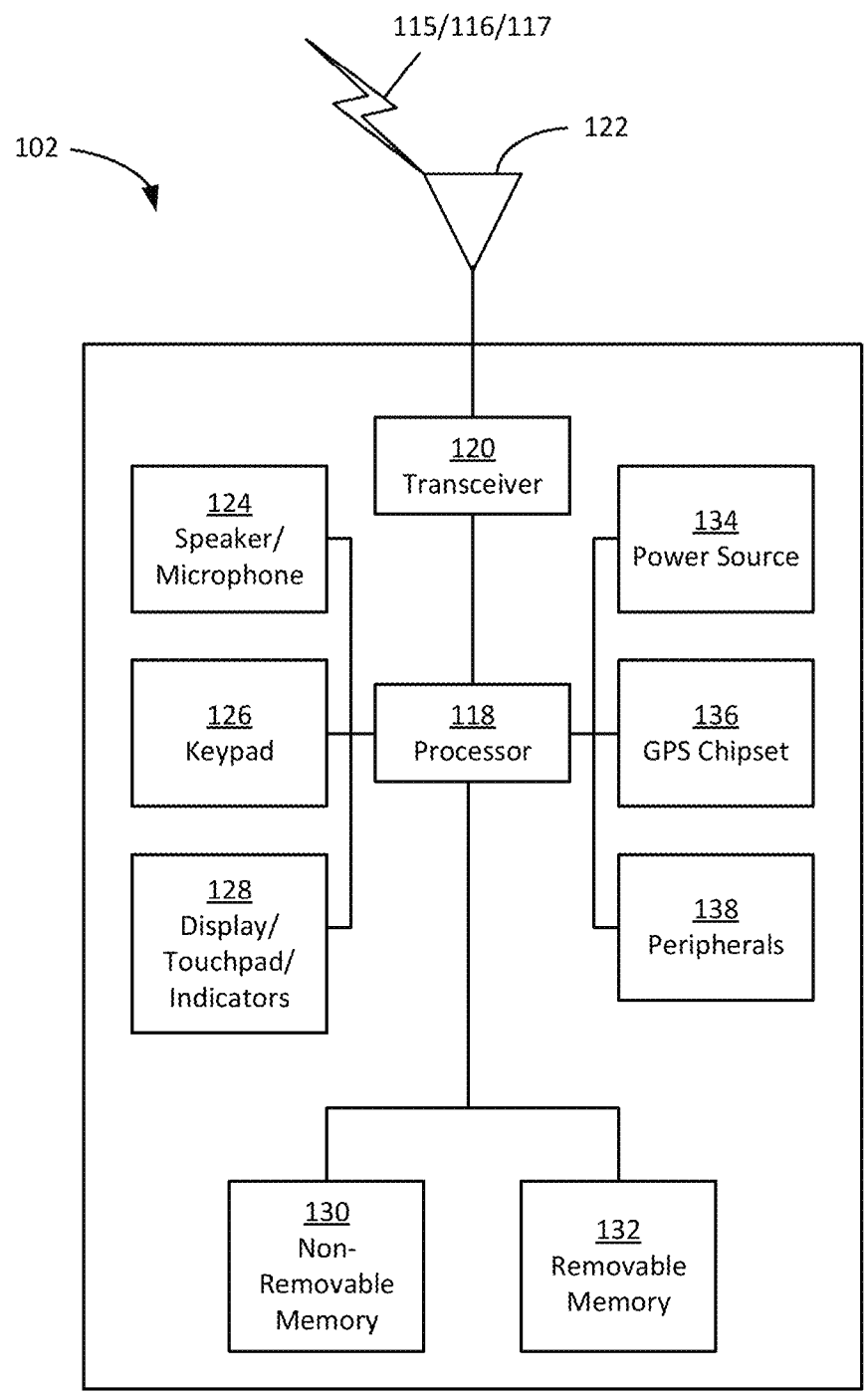
FIG. 2 is a block diagram of an example apparatus or device configured for wireless communications such as, for example, a wireless transmit/receive unit (WTRU)

FIG. 2 is a block diagram of an example apparatus or device configured for wireless communications in accordance with the embodiments illustrated herein, such as for example, a WTRU 102. As shown in FIG. 2, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 2 and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 2 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/ receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 2 as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 3:
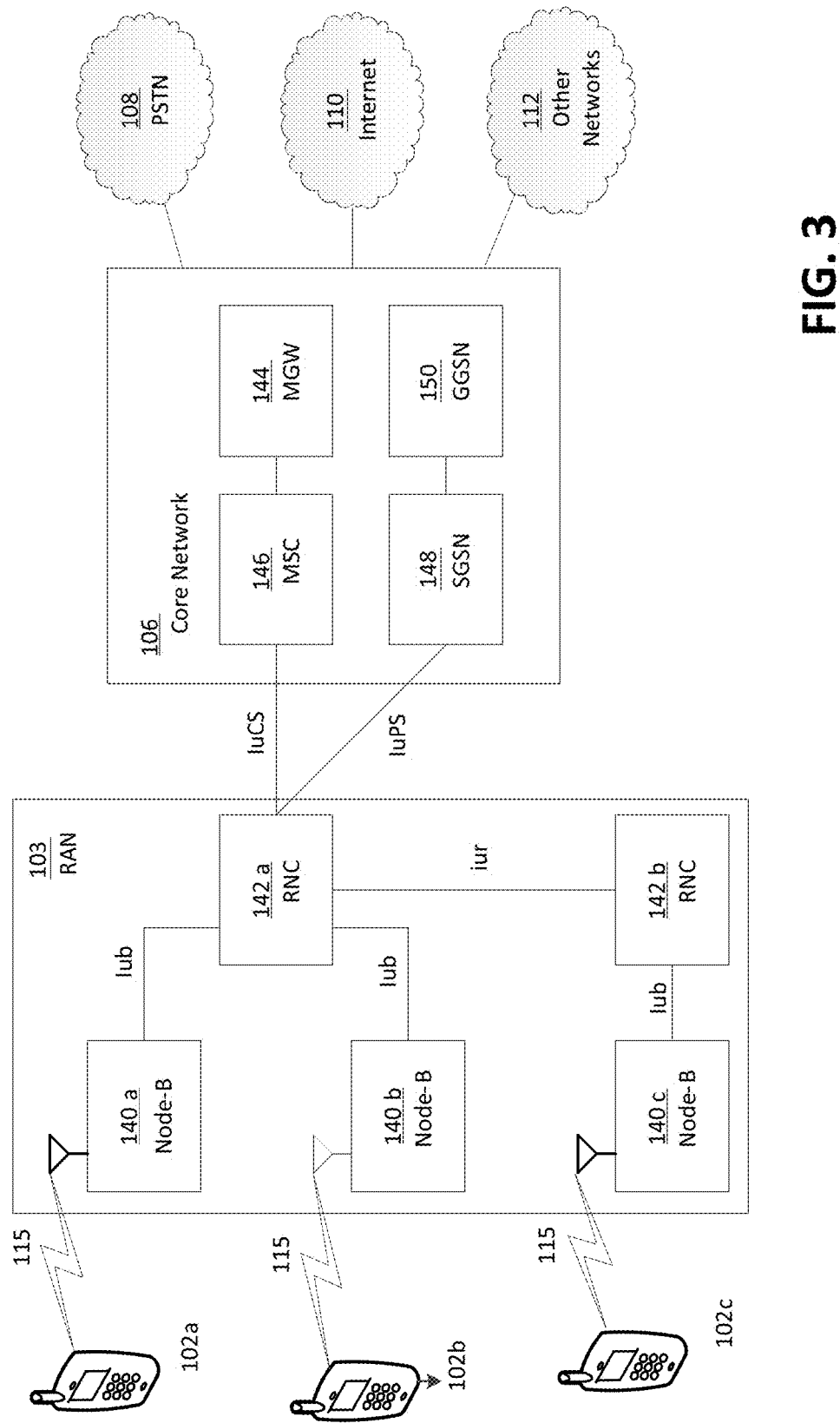
FIG. 3 is a system diagram of a first example radio access network (RAN) and core network.

FIG. 3 is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 3, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 3, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 3 may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 4:
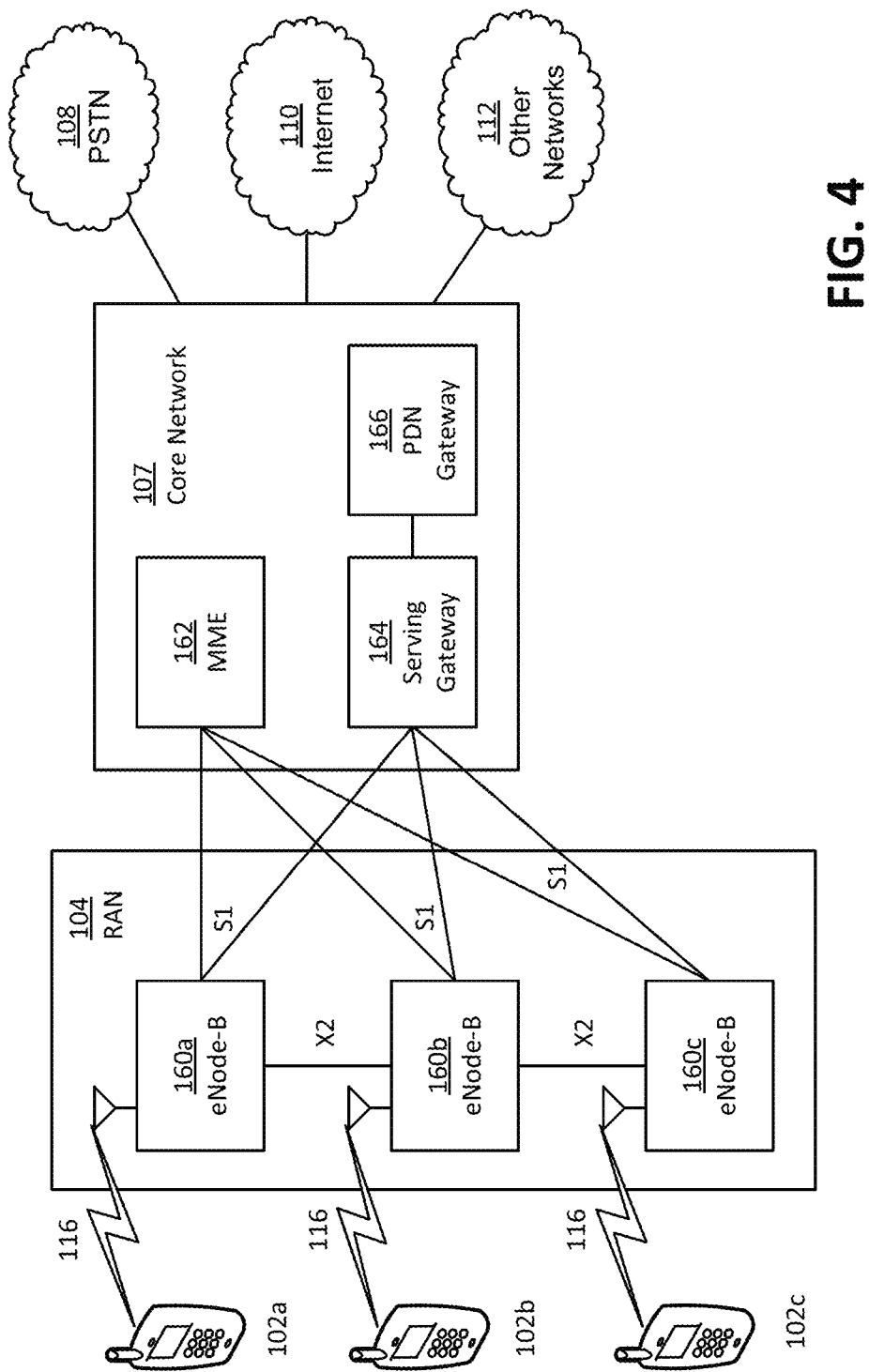
FIG. 4 is a system diagram of a second example RAN and core network.

FIG. 4 is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 4, the eNode-Bs 160a, 160b, 160c may communicate with one another over an X2 interface.

The core network 107 shown in FIG. 4 may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 5:
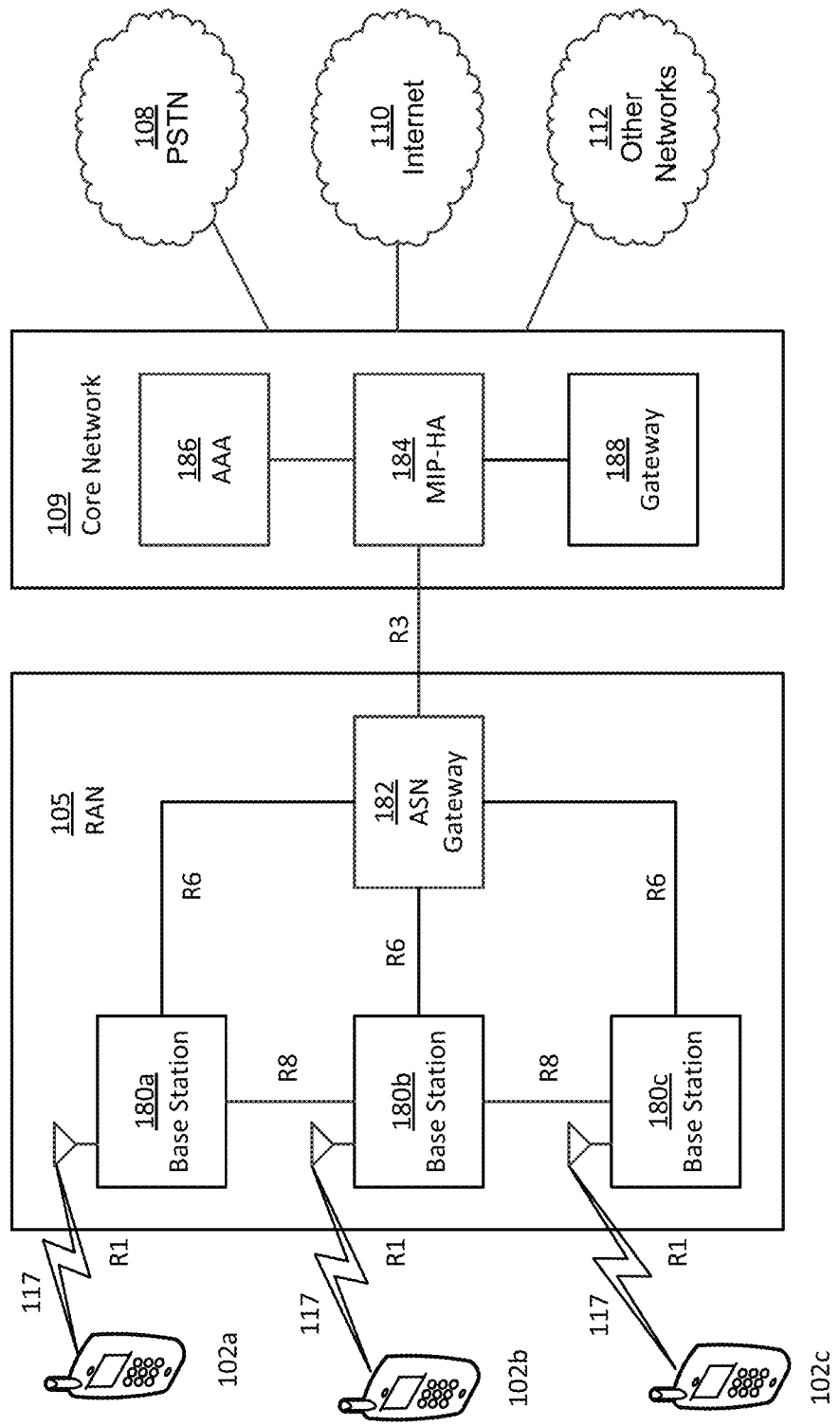
FIG. 5 is a system diagram of a third example radio access network RAN and core network.

FIG. 5 is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 5, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 5, the RAN 105 may be connected to the core network 109. The communication link between the RAN 105 and the core network 109 may be defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 5, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 1-6 are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 1-6 are provided by way of example only, and it is understood that the subject matter disclosed and claimed herein may be embodied or implemented in any similar communication system, whether presently defined or defined in the future.

Figure 6:
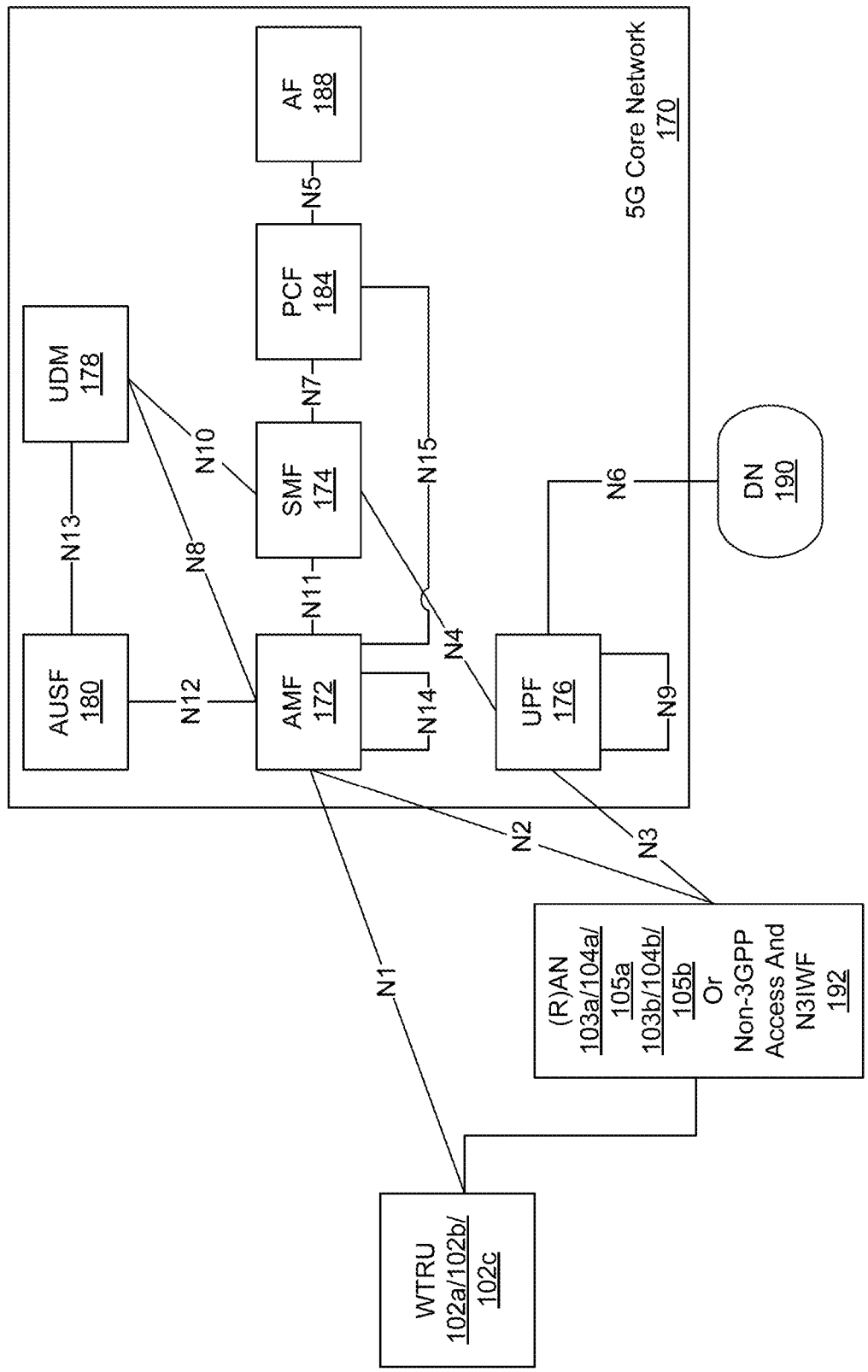
FIG. 6 is a system diagram of a fourth example radio access network RAN and core network.

The 5G core network 170 shown in FIG. 6 may include an access and mobility management function (AMF) 172, a session management function (SMF) 174, a user plane function (UPF) 176, a user data management function (UDM) 178, an authentication server function (AUSF) 180, a Network Exposure Function (NEF), a policy control function (PCF) 184, a non-3GPP interworking function (N3IWF) 192 and an application function (AF) 188. While each of the foregoing elements are depicted as part of the 5G core network 170, it will be appreciated that any one of these elements may be owned and/or operated by an entity other than the core network operator. It should also be appreciated that a 5G core network may not consist of all of these elements, may consist of additional elements, and may consist of multiple instances of each of these elements. FIG. 6 shows that network functions directly connect to one another, however, it should be appreciated that they may communicate via routing agents such as diameter routing agents or message buses.

The AMF 172 may be connected to each of the RAN 103/104/105/103b/104b/105b via an N2 interface and may serve as a control node. For example, the AMF 172 may be responsible for registration management, connection management, reachability management, access authentication, access authorization. The AMF 172 may generally route and forward NAS packets to/from the WTRUs 102a, 102b, 102c.

The SMF 174 may be connected to the AMF 172 via an N11 interface, maybe connected to a PCF 184 via an N7 interface, and may be connected to the UPF 176 via an N4 interface. The SMF 174 may serve as a control node. For example, the SMF 174 may be responsible for Session Management, WTRUs 102a, 102b, 102c IP address allocation & management and configuration of traffic steering rules in the UPF 176, and generation of downlink data notifications.

The SMF 174 may also be connected to the UPF 176, which may provide the WTRUs 102a, 102b, 102c with access to a data network (DN) 190, such as the Internet 110, to facilitate communications between the WTRUs 102a, 102b, 102c and IP-enabled devices. The SMF 174 may manage and configure traffic steering rules in the UPF 176 via the N4 interface. The UPF 176 may be responsible for interconnecting a packet data unit (PDU) session with a data network, packet routing and forwarding, policy rule enforcement, quality of service handling for user plane traffic, and downlink packet buffering.

The AMF 172 may also be connected to the N3IWF 192 via an N2 interface. The N3IWF facilities a connection between the WTRUs 102a, 102b, 102c and the 5G core network 170 via radio interface technologies that are not defined by 3GPP.

The PCF 184 may be connected to the SMF 174 via an N7 interface, connected to the AMF 172 via an N15 interface, and connected to an application function (AF) 188 via an N5 interface. The PCF 184 may provide policy rules to control plane nodes such as the AMF 172 and SMF 174, allowing the control plane nodes to enforce these rules.

The UDM 178 acts as a repository for authentication credentials and subscription information. The UDM may connect to other functions such as the AMF 172, SMF 174, and AUSF 180.

The AUSF 180 performs authentication related operations and connects to the UDM 178 via an N13 interface and to the AMF 172 via an N12 interface.

The NEF exposes capabilities and services in the 5G core network 170. The NEF may connect to an AF 188 via an interface and it may connect to other control plane and user plane functions (180, 178, 172, 172, 184, 176, and N3IWF) in order to expose the capabilities and services of the 5G core network 170.

The 5G core network 170 may facilitate communications with other networks. For example, the core network 170 may include, or may communicate with, an IP gateway (e.g., an IP multimedia subsystem (IMS) server) that serves as an interface between the 5G core network 170 and the PSTN 108. For example, the core network 170 may include, or communicate with a short message service (SMS) service center that facilities communication via the short message service. For example, the 5G core network 170 may facilitate the exchange of non-IP data packets between the WTRUs 102a, 102b, 102c and servers. In addition, the core network 170 may provide the WTRUs 102a, 102b, 102c with access to the networks 112, which may include other wired or wireless networks that are owned and/or operated by other service providers.

Figure 7:
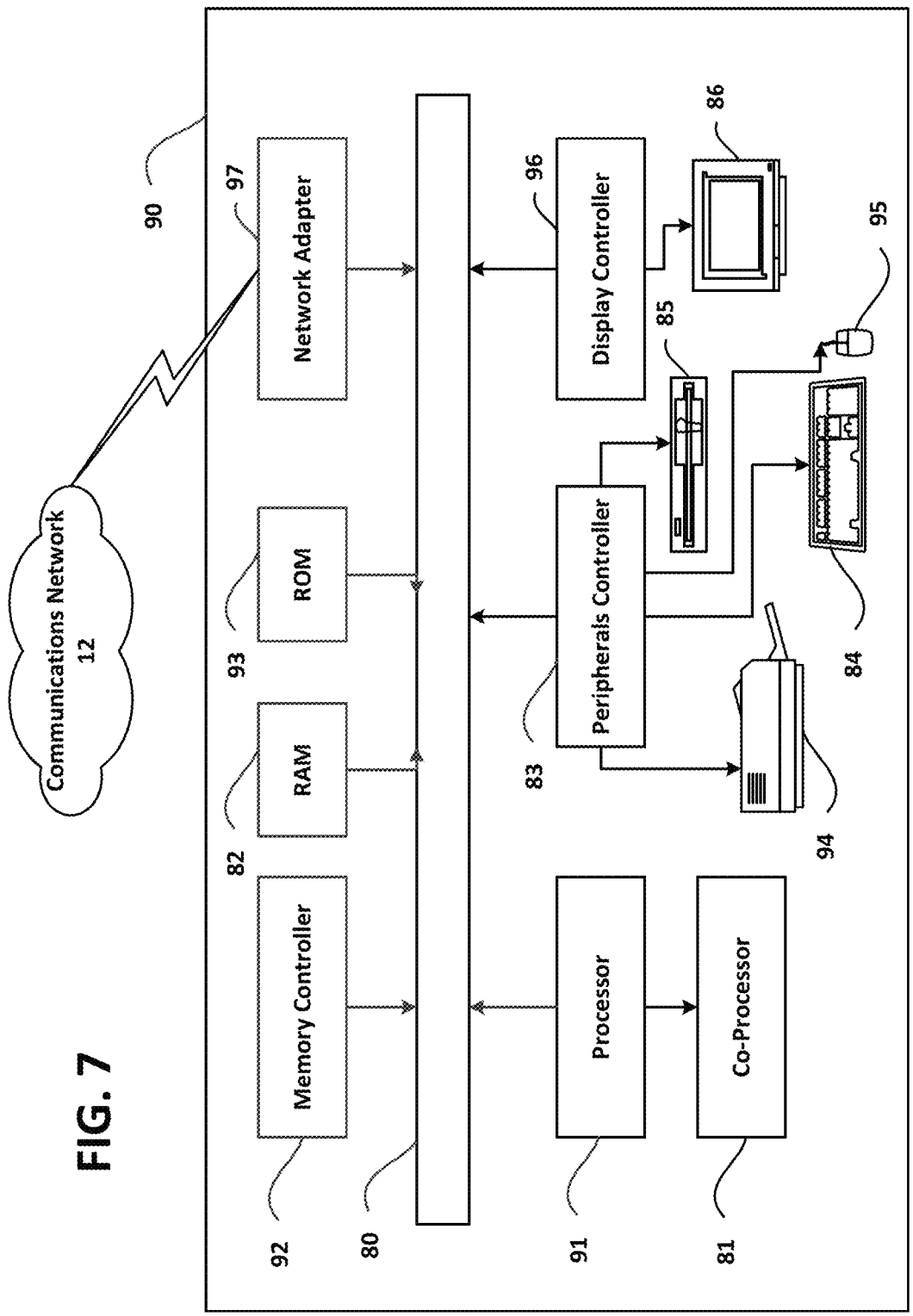
FIG. 7 is a block diagram of an example computing system in which a node of a communication system may be embodied.

FIG. 7 is a block diagram of an exemplary computing system 90 in which one or more apparatuses of the communications networks illustrated or described herein may be embodied, such as certain nodes or functional entities in the RAN 103/104/105, Core Network 106/107/109, PSTN 108, Internet 110, or Other Networks 112.

Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 1-6, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

Figure 8:
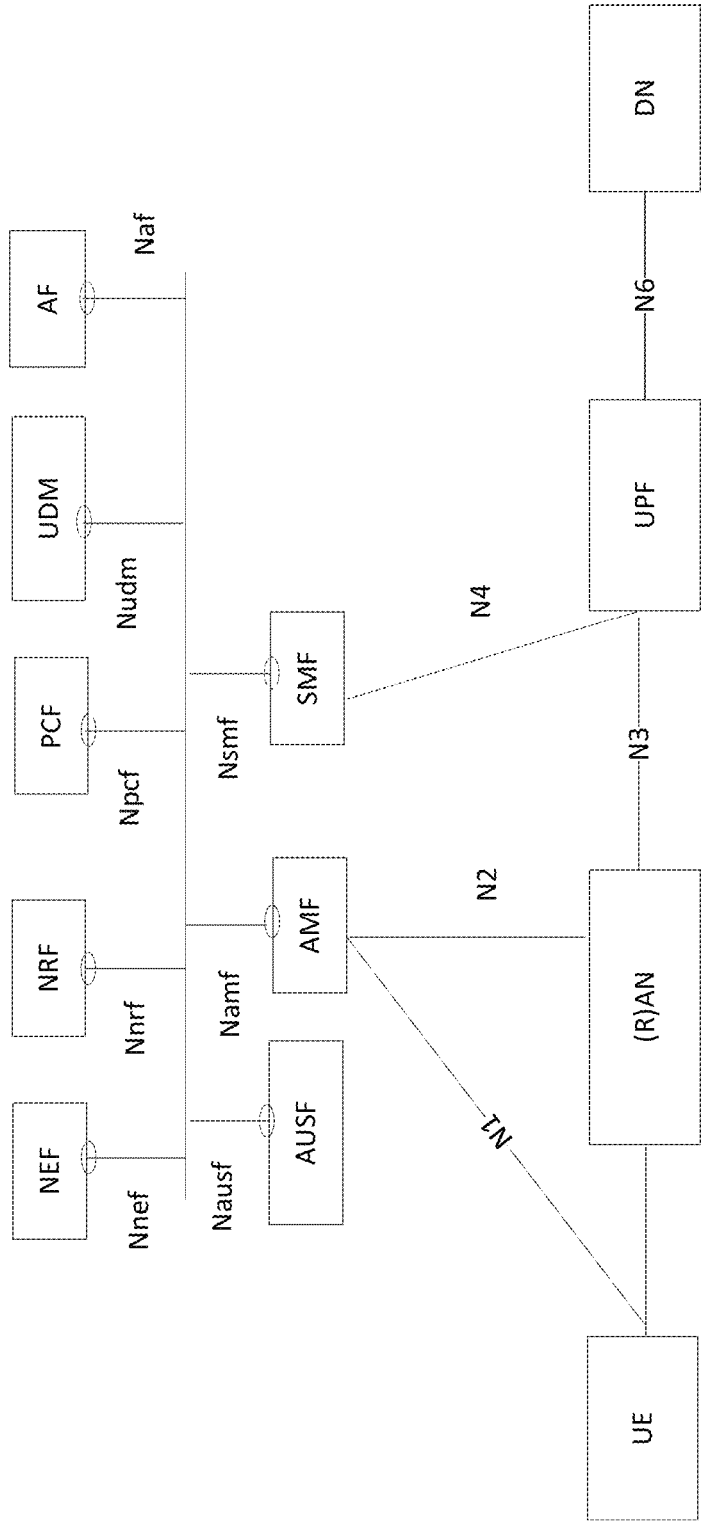
FIG. 8 is a block diagram of a non-roaming network architecture with service-based interfaces within the control plane of the core network.
Figure 9:
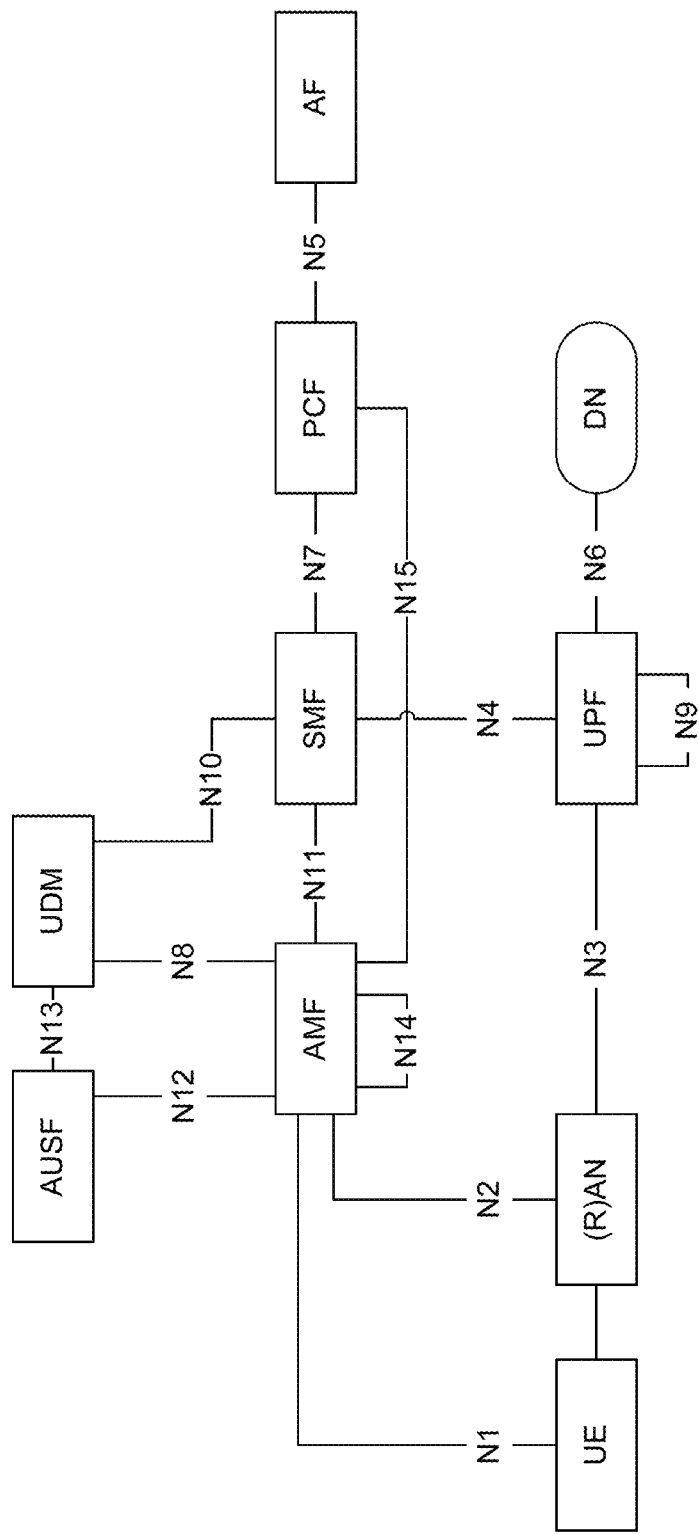
FIG. 9 is a block diagram presenting another view of the network of FIG. 1 and illustrating the reference points through which various network functions interact.

FIG. 8 is a block diagram of a non-roaming network architecture for the 5G network with service-based interfaces within the control plane of the network. FIG. 9 is a block diagram presenting another view of the 5G network of FIG. 1 and illustrating the reference points through which various network functions interact. Note that the mobility management and session management functions are separated. A single N1 NAS connection is used for both Registration Management and Connection Management (RM/CM) and for SM-related messages and procedures for a UE. The single N1 termination point is located in AMF. The AMF forwards SM related NAS information to the SMF. AMF handles the Registration Management and Connection Management part of NAS signaling exchanged with the UE. SMF handles the Session management part of NAS signaling exchanged with the UE.

As shown in FIG. 8, the NF Repository Function (NRF) is defined as a logical function in the 5G service-based framework for supporting the following functionality:

Supports service discovery function. Receive NF Discovery Request from NF instances, and provides the information of the discovered NF instances to the NF instance;

Maintains the NF profile of available NF instances and their supported service information.

The NF profile of a NF instance maintained in an NRF may include the following information:

NF instance ID
NF type
PLMN ID
Network Slice related Identifier(s) e.g. S-NSSAI, NSI ID
FQDN or IP address of NF
NF capacity information
NF Specific Service authorization information
Names of supported services
Endpoint information of instance(s) of each supported service
Identification of stored data/information.

Table 1 defines the NRF Services and Service Operations. Specifically, the NRF will perform the registration/de-registration and update on a NF, and help other entities (e.g., NF and SCS/AS) to discover the desired NFs.

TABLE 1

NF services provided by the NRF

| Service Name | Service Operations | Operation Semantics | Example Consumer(s) |
| --- | --- | --- | --- |
| Nnrf_NFManagement | NFRegister | Request/Response | AMF, SMF, UDM, AUSF, NEF, PCF, SMSF, NSSF |
| | NFUpdate | Request/Response | AMF, SMF, UDM, AUSF, NEF, PCF, SMSF, NSSF |
| | NFDeregister | Request/Response | AMF, SMF, UDM, AUSF, NEF, PCF, SMSF, NSSF |
| | NFStatusSubscribe | Subscribe/Notify | AMF, SMF, PCF, NEF, NSSF, SMSF, AUSF |
| | NFStatusNotify | | AMF, SMF, PCF, NEF, NSSF, SMSF, AUSF |
| | NFStatusUnSubscribe | | AMF, SMF, PCF, NEF, NSSF, SMSF, AUSF |
| Nnrf_NFDiscovery | Request | Request/Response | AMF, SMF, PCF, NEF, NSSF, SMSF, AUSF |

Figure 10:
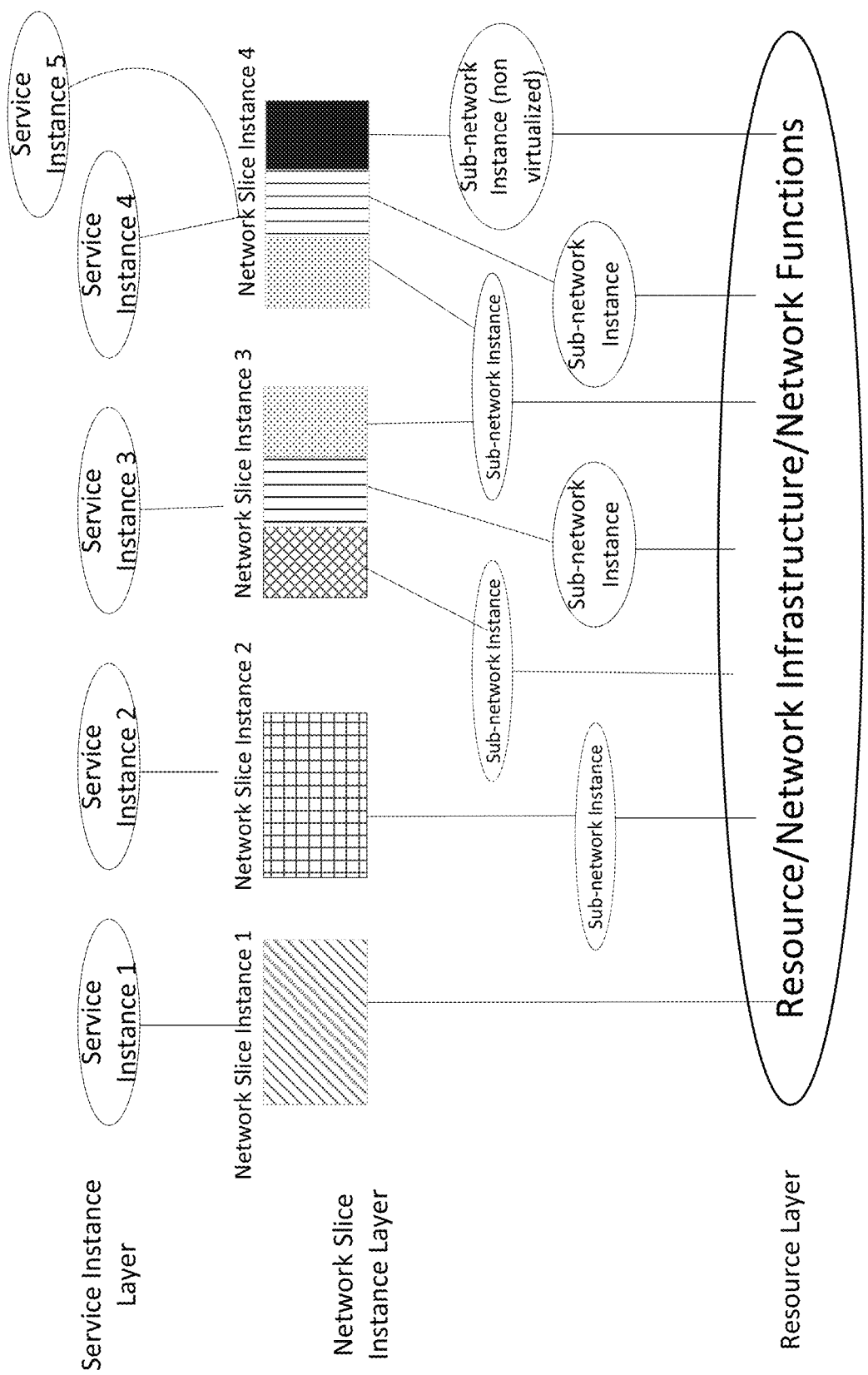
FIG. 10 illustrates a concept of network slicing.

Network slicing is a mechanism that could be used by mobile network operators to support multiple 'virtual' networks behind the air interface across the fixed part of the mobile operator's network, both backhaul and core network. This involves 'slicing' the network into multiple virtual networks to support different radio access networks (RANs) or different service types running across a single RAN. Network slicing enables the operator to create networks customized to provide optimized solutions for different market scenarios which demands diverse requirements, e.g. in the areas of functionality, performance, and isolation. FIG. 10 shows a conceptual architecture of network slicing. A network slice instance is made up of a set of network functions and the resources to run these network functions. The different shading is used to indicate the different network slice instances or sub-network slice instances. A sub-network slice instance comprises a set of network functions and resources to run those network functions, but is not in itself a complete logical network. A sub-network slice instance may be shared by multiple network slice instances.

3GPP is considering to incorporate network slicing technology in the 5G network. This technology is a good fit for the 5G network, because the 5G use cases (e.g., massive Internet of Things (IoT), critical communications, and enhanced mobile broadband) demand very diverse and sometimes extreme requirements. The current pre-5G architecture utilizes a relatively monolithic network and transport framework to accommodate a variety of services such as mobile traffic from smart phones, over-the-top (OTT) content, feature phones, data cards, and embedded machine-to-machine (M2M) devices. It is anticipated that the current architecture is not flexible and scalable enough to efficiently support a wider range of business needs when each has its own specific set of performance, scalability and availability requirements. Furthermore, introduction of new network services should be made more efficient. Nevertheless, several use cases are anticipated to be active concurrently in the same operator network, thus requiring a high degree of flexibility and scalability of the 5G network. Network slicing enables the operator to create networks customized to provide optimized solutions for different market scenarios which demand diverse requirements, e.g. in the areas of functionality, performance and isolation.

Figure 11:
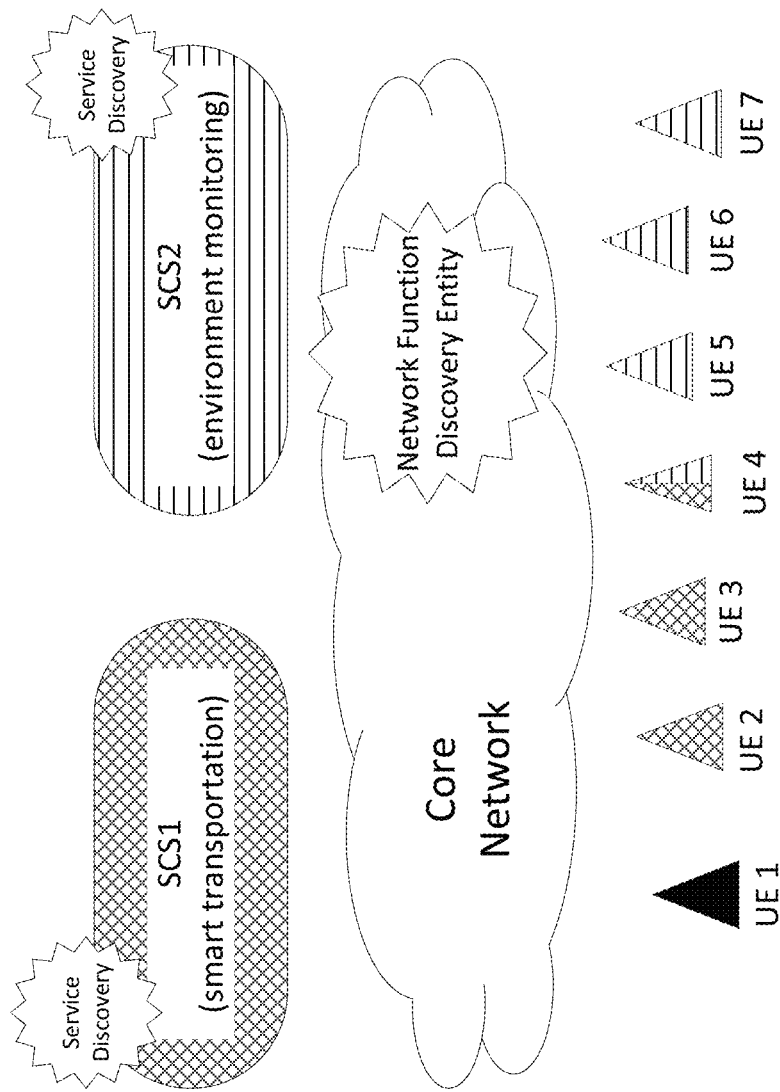
FIG. 11 is a diagram illustrating a use case involving service discovery through a mobile core network.

FIG. 11 is a diagram illustrating a use case involving Device/SCS/AS service discovery and network function (i.e., network service) discovery through a 3GPP core network. In the example, Application server 1 (i.e., SCS1) provides a smart transportation service, by monitoring the street traffic in real-time and collecting traffic statistics. Application server 2 (i.e., SCS2) manages a group of sensors that monitor and measure environmental data, such as air quality, humidity and temperature. Both servers provide their own service discovery functionality, and can be accessed through the mobile core network.

As further illustrated, a first device, which may be referred to as Device1 (e.g., UE1) may be looking for the Device/SCS/AS service that can provide traffic monitoring and statistics. Prior to the methods and systems disclosed herein, UE1 must connect to the SCS1 and SCS2 through the mobile core network, and perform Device/SCS/AS service discovery at each application server separately. In this manner, Device1 may find that SCS1 can provide such information, and Device1 may then stay connected with SCS1.

As further illustrated, both application servers may be looking for devices that can provide Device/SCS/AS service data that matches their interest. In other words, SCS1 tries to find some devices that provide traffic monitor data and SCS2 tries to find devices that provide real-time environmental measurements such as air quality and temperature. An application server could perform the service discovery process by communicating with each individual device (i.e., UE2-UE7) through the core network. However, this is inefficient, as it requires a lot of communications between the application server and each individual device.

It can be seen in the example of FIG. 11 that UE1 needs to connect to each of the available application servers to perform the Device/SCS/AS service discovery, so that it can determine if an application server is able to provide Device/SCS/AS services for which it is looking. This is especially true in the IoT domain, because there may be various IoT servers that are deployed by different 3rd party application service providers, i.e., IoT service provisioning is quite fragmented. There is usually no centralized server to maintain all the service context for different verticals (e.g., smart transportation, industry and healthcare). In this sense, it is not efficient to perform one Device/SCS/AS service discovery process at each application server through the mobile core network.

Moreover, each application server only knows the service context under its management. As a result, an application server is not aware of service context information of other application servers, which makes the service discovery process less efficient. For example, both smart transportation and environment monitoring service may have some monitoring cameras on the street, but without collaboration between the two application servers, there is no way for each AS to know about each other's services. Performing Device/SCS/AS service discovery separately at each SCS/AS may not result in the best selection for providing service because each SCS/AS has only knowledge of its own domain.

Application servers (e.g., SCS1 and SCS2) may be able to query the individual devices to discover those that may be used to provide the desired service (e.g. traffic monitoring). In addition, the application servers may even be aware of some device context information that may be relevant to the desired service (such as the location of those available devices). However, the application servers do not know the network status of those devices. For example, assume UE2 is an environment sensor and is in sleeping mode, and won't be reachable through the mobile core network until 12 hours later. UE3 may be capable of efficiently transferring the small data through the control plane of the core network. UE4 may be accessed not only via 3GPP access, but also via non-3GPP access such as WiFi. Service discovery cannot reveal this type of transport network capability information. This means performing Device/SCS/AS service discovery without considering the underlying network status may lead to an inefficient data communication once the service is enabled or in operation.

Some service discovery requirements have been specified for the 5G system but have not yet been addressed in the system. In particular, it has been specified that the 5G system shall efficiently support service discovery mechanisms where UEs can discover, subject to access rights (i) status of other UEs (e.g., sound on/off); (ii) capabilities of other UEs (e.g., the UE is a relay UE) and/or; (iii) services provided by other UEs (e.g., the UE is a color printer).

At present, the 5G Core Network performs Network Function discovery in order to find NFs to serve the UE. For example, an AMF may interact with an NRF to discover an SMF that meets a particular criterion. An SMF may interact with an NRF to discover a UPF that meets a particular criterion.

Once a UE obtains network connectivity, UE hosted IoT applications will typically perform service discovery in order to find IoT Servers (i.e. SCS/AS's) and IoT Applications (e.g. hosted on other UEs) that provide their desired services.

Disclosed herein are methods and systems by which the two above processes, NF discovery and application layer service discovery can be combined. In other words, mechanisms are proposed for integrating the application layer service discovery in the mobile core network with network function discovery (i.e., network service discovery).

In one aspect, methods are disclosed that allow a UE and application server to advertise their services within the core network to make the Device/SCS/AS service capability discoverable;

In another aspect, methods are disclosed for a UE to initiate Device/SCS/AS service discovery in the core network through (i) a registration procedure and (ii) a PDU session establishment procedure.

In another aspect, a method is disclosed for a UE to subscribe to a certain Device/SCS/AS service capability in the core network.

In yet another aspect, a method is disclosed for a SCS/AS to initiate the Device/SCS/AS service discovery process in the core network.

Configuration for Enabling Service Discovery in Core Network

The following describes a method for a UE and application server to announce or provide their service capability information to the core network, so that other entities (e.g., UE and NFs) can initiate the service discovery process within the core network.

In order to enable the service discovery within the core network, a UE and SCS/AS need to interact with an NRF, which performs the discovery process. The service capability information may be stored at UDM/UDR/UDSF, or alternatively at NRF.

Figure 12:
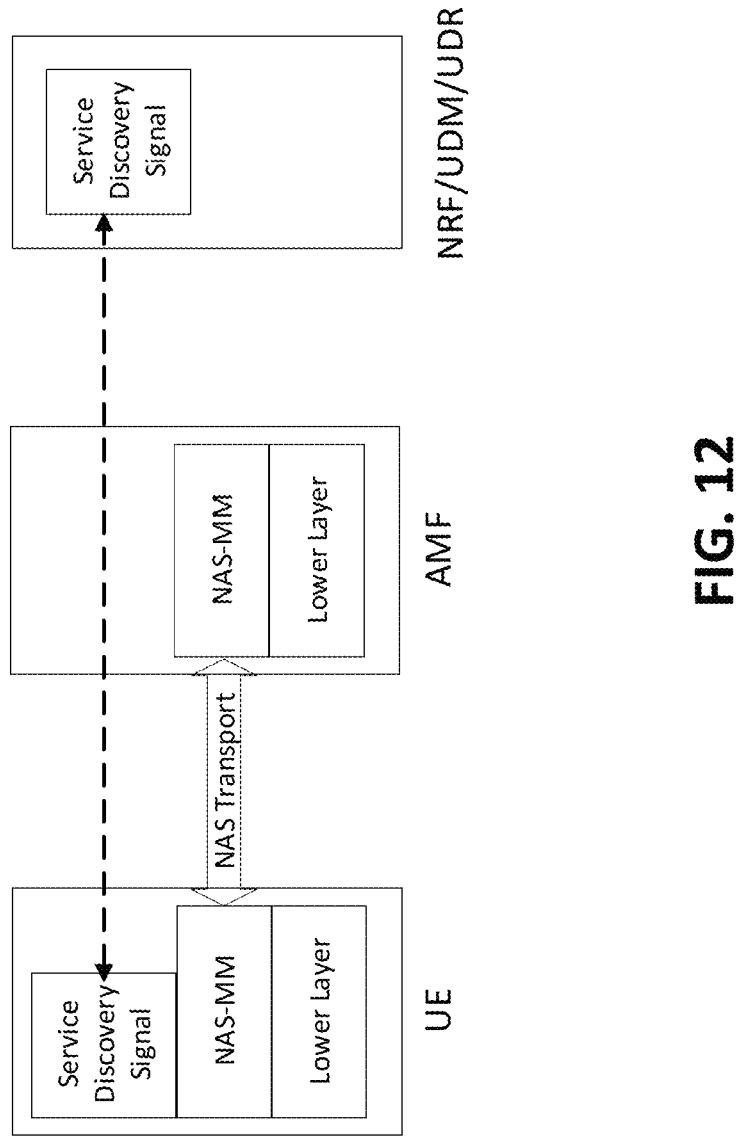
FIG. 12 is a diagram of a protocol stack illustrating use of a NAS connection to transfer service capability information to/from a core network and to initiate a service discovery process at an NRF.

FIG. 12 shows an example protocol stack illustrating how a UE utilizes the NAS connection to transfer the service capability information to/from the core network and initiate the service discovery process at an NRF. The service discovery related message is transferred on top of the N1 NAS connection between the UE and AMF. This service discovery includes both a Device/SCS/AS service and network service.

This protocol stack may be used by the UE to send its own service capability information to the core network so that it can be discovered by other UEs and/or AF's. Also, it may be used by the UE to send discovery requests to the network and receive discovery results from the network. FIG. 12 shows that the request may terminate at the NRF, but it could alternatively terminate at the UDM/UDR.

Service Capability Information Element in Core Network

Service capability information provided by either a UE or SCS/AS may be stored in a UDM/UDR/UDSF. For example, the protocol stack of FIG. 12 may be used to send discovery information to the NRF and the NRF may store the information in the UDM/UDR. Alternatively, the information may be stored locally in the NRF or in a UDM/UDR/UDSF that is associated with the NRF. New information elements may be created for storing the information of service capabilities. The service capability may include information that is listed in Table 2.

TABLE 2

Service Capability Information Maintained in Core Network Function

| Field | Description |
|---|---|
| Provider ID | ID of the service capability provider, i.e., UE ID, SCS/AS ID, or DNN |
| Service capability ID | ID of the service capability |
| Service capability type | The type of service capabilities the provider supports. For example, remote device management, subscription/notification, smart metering in general purpose. In terms of oneM2M, this could be the resource types that the SCS/AS support. |
| Device/SCS/AS Service Capability Detail | This includes additional information related to the specific service capability type. For example, for a video monitoring capability, this field may include the allowed video resolution. This field may be in the form of (parameter, value) pairs. For example: (resolution, 1024 × 768) (manufacturer, Sony) |
| Service area of Device/SCS/AS service capability | Indicate the area in which the device/server is allowed to subscribe the service capability. For example, the service area could consist of a list of tracking areas, where devices/servers can subscribe to the service only when they are located in those tracking areas. |
| Allowed PLMN | ID of PLMN where the service capability is provided |
| Supported API type | The type of interface that are supported for the service capability, e.g., RESTful (e.g., oneM2M CRUD) |
| Type of device using Device/SCS/AS service | Indicate the type of devices that can use the service capability, e.g., end device, gateway or cloud server. |

TABLE 2-continued

Service Capability Information Maintained
in Core Network Function

| Field | Description |
|---|---|
| Allowed type of devices | Indicate the type of devices that can discover this service capability, e.g., only UE, only SCS/AS, or both |
| Required QoS | Indicate a list of QoS parameters in the core network for data that is generated by the service capability. For example, for a real-time monitoring service, the underlying data rate may be up to 1 Gbps. |
| Associated network services | Indicate the type of network service that may be required or associated for providing the service capability. For example, a remote device management service capability needs NIDD and device triggering provided by core network. |
| Charging policy information | Indicate the charging policy (e.g., charging policy ID) in case the service capability is provided through core network |
| Required protocol type | IPv4, IPv6 or non-IP type of PDU session is needed for the data transfer. |
| Valid duration | Indicate how long the service capability can be provided through the network, e.g., permanent or a specific duration each day. |
| Restrictions | Indicate some restriction of providing the service capability. For example, the Device/SCS/AS service capability can be provided to authenticated UE, UE with subscription, remote UE, etc. Alternatively, this may contain a list of device IDs (for example IMSIs) or SCS/AS IDs. |

UE Advertising Service Capability

Figure 13:
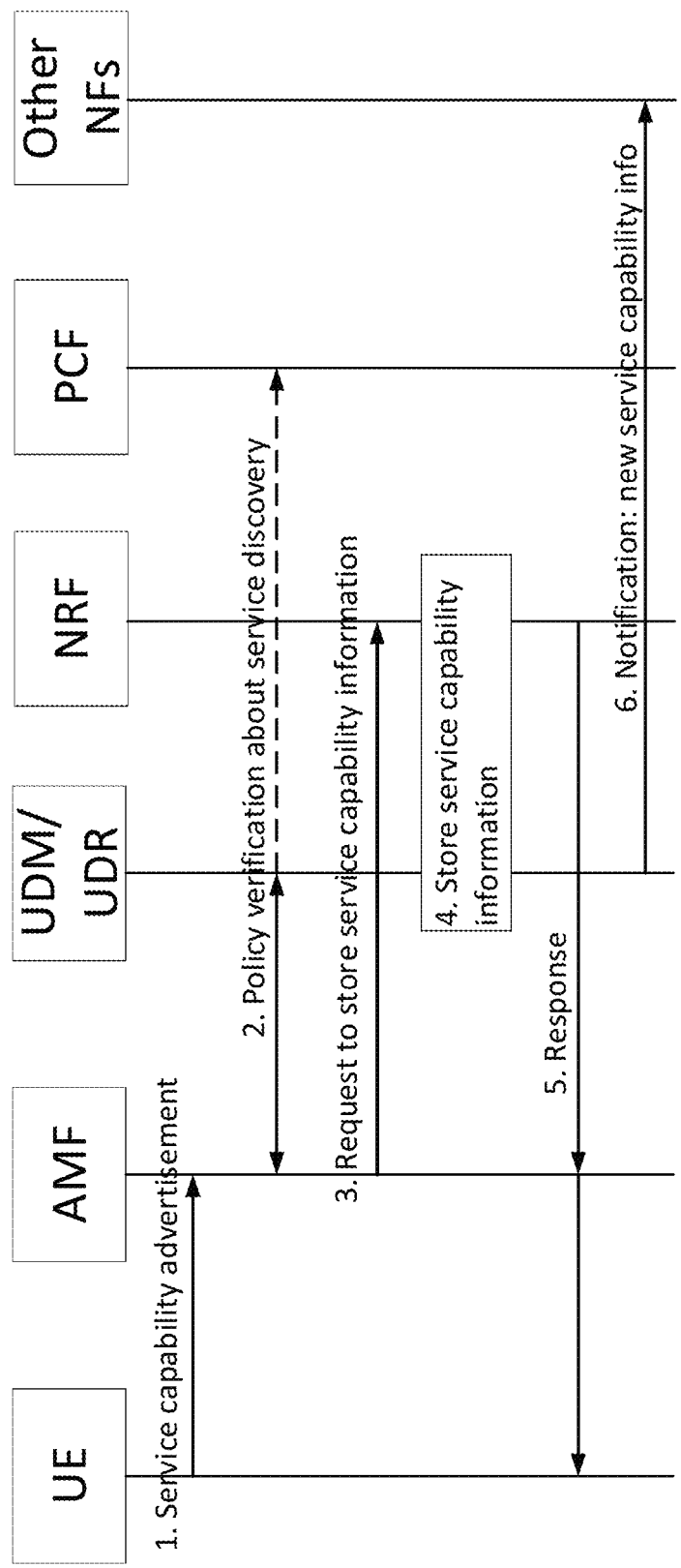
FIG. 13 is a call flow illustrating a method by which a UE may advertise service capability information to a core network.

FIG. 13 is a call flow illustrating a method by which a UE may advertise its Device/SCS/AS service capability information. The method may take place along with registration, service request or session management processes.

In step 1, the UE may send information concerning the service capabilities it supports to the AMF. The information may be included in a NAS message (e.g., initial registration request, registration update, service request message, PDU session establishment request, session modification or session release request). In addition to the service capability information listed in Table 2, the location where the service capability information is stored in the core network may be included. Such location may be identified using an address/ID of UDR/UDM, UDSF or even an NRF. If the UE does not specify the location, the core network entity may use a default location, which may be pre-configured.

In step 2, the AMF contacts UDM/UDR to verify if the UE is allowed to advertise its service capability, and is eligible to provide any service capability through the core network. Alternatively, the AMF may check policies that are stored in the PCF to determine if the UE is allowed to advertise its capabilities. In order to reach the appropriate PCF, either AMF directly stores the PCF ID that serves the UE or AMF gets PCF information from UDM based on UE ID and subscription information.

In step 3, once the verification is complete, the AMF forwards the request to the NRF. The information listed in Table 2 may be passed.

In step 4, the NRF stores the information locally or in the UDM/UDR. The information may be stored in any suitable data structure, such as a table, or non-relational database. The UE ID (e.g., 5G-GUTI, SUPI) may be used to link the information with the UE providing the service capability.

In step 5, the NRF sends a response to the UE via the AMF, which includes the address (e.g., URI) for accessing the service capability information. If needed at some later time, the address allows the UE to update or delete this information by directly contacting the NRF.

In the meantime, in step 6, the NRF notifies the other NF's who have subscribed to notifications about new services that there is a new service capability added with the address to access the information. In other words, the new service capability is registered at the NRF and the NRF sends a notification to any NF that asked to be notified when this type of service capability is registered. In addition, the NRF may notify UEs that asked to be notified when this type of service capability is available through core network.

SCS/AS Advertising Service Capability

Figure 14:
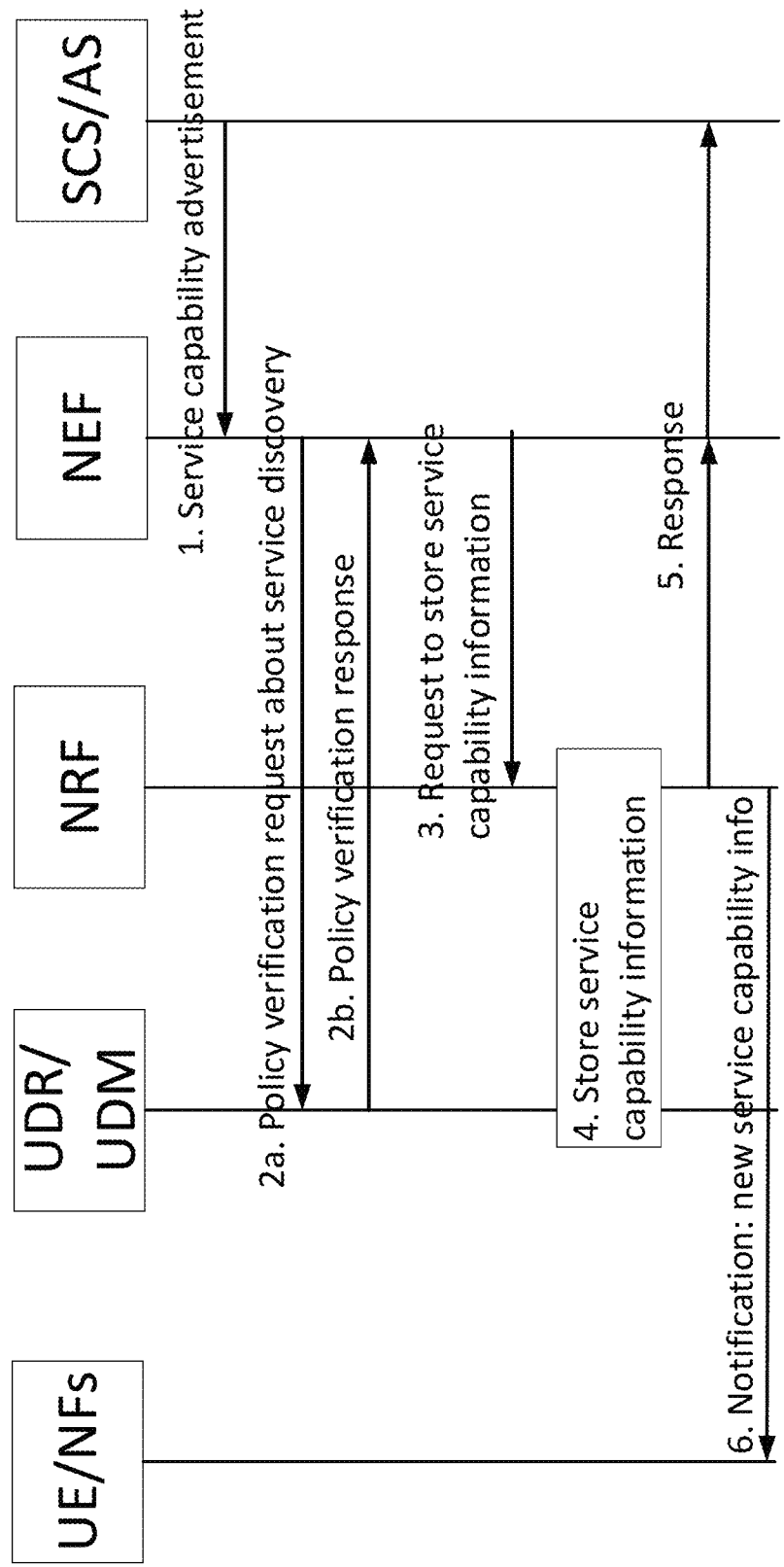
FIG. 14 is a call flow illustrating a method by which a SCS/AS may advertise service capability information to a core network.

The SCS/AS may also advertise its Device/SCS/AS service capabilities within the core network. FIG. 14 is a call flow diagram illustrating one example of a method by which the SCS/AS may advertise its Device/SCS/AS service capabilities within the core network.

As shown, in step 1, the SCS/AS may send its service capability information to the NEF in order to make it discoverable in the core network. In addition to the information listed in Table 2, the following information may also be included: (i) an indication whether the information is discoverable for a non-3GPP UE, or a roaming UE; and (ii) an address or identifier (ID) of the UDR/UDM that will store the information In step 2, NEF contacts UDR/UDM to verify if the SCS/AS is allowed to advertise its service capability and is eligible for provide the service capability through the core network. Alternatively, the NEF could check this against a policy by querying the PCF.

In step 3, once the verification is done, NEF sends request to NRF, where service capability information will be stored.

In step 4, the NRF stores the service capability information in a manner similar to that discussed above with respect to step 4 of FIG. 13.

In step 5, the NRF sends a response to SCS/AS via NEF, including the ID of UDR/UDM and address of service capability information (e.g., URI).

In step 6, the NRF notifies the UEs and/or other NFs that asked to be notified when this type of service capability is added, and the NRF will make it discoverable in the future. Moreover, the NRF may notify SCS/AS that asked to be notified as well.

It is also possible that the NRF may involve some device/application server information when storing the service capability information, such as device type. The discovery request also could be combined with information about the Device/AS issuing the request so that the response is better suited.

Alternatively, the SCS/AS may only notify the core network that it provides service discovery functionality for a list of service capabilities, so that the core network could steer a UE to the SCS/AS later to perform the service discovery when the UE registers with the network. Moreover, the core network may intelligently forward the service discovery request to the SCS/AS for further processing the request and performing the service discovery. In order to do so, a core network entity needs to store the abstract service capability information, and to select the SCS/AS based on such information. When the core network receives the response from the selected SCS/AS, it may process the response and forward it back to the UE.

Another alternative way for the core network to get the service capability information is that the core network entity (e.g., NRF) may proactively or periodically update the service capability information by communicating with the SCS/AS via a NEF. In this manner, the discovery results may be more accurate and update-to-date.

UE Initiated Service Discovery in the Core Network

The following describes a method for Device/SCS/AS service discovery initiated by a UE. The method may be triggered along with a NAS message, such as a registration procedure, PDU session establishment procedure, or service request.

The service discovery result may affect certain NF selections, such as the network slice selection, AMF selection, SMF selection, UPF selection and SCS/AS (i.e., DN) selection.

Service Discovery as part of Registration Procedure

Figure 15:
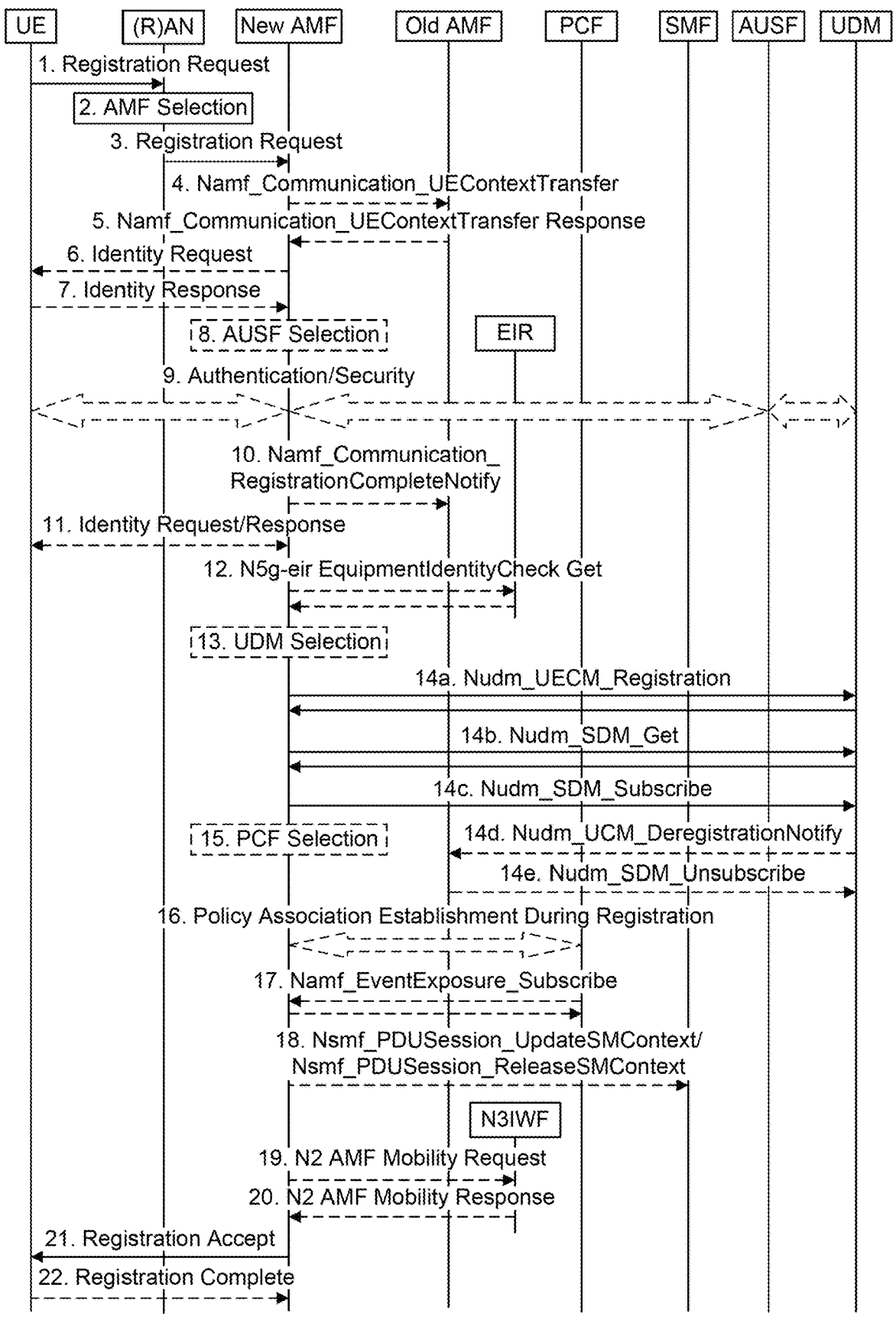
FIG. 15 is a call flow illustrating a registration procedure modified to allow a UE to initiate service discovery during registration.

FIG. 15 is a call flow illustrating a method by which a UE may initiate service discovery as part of a registration procedure, such as the registration procedure defined in 3GPP TS 23.502, Procedures for the 5G System; Stage 2, v0.5.0, Release 15. FIG. 15 illustrates how the steps of the registration procedure of 3GPP TS 23.502 may be modified to allow a UE to initiate the service discovery process along with the general registration procedure. In the example of FIG. 15, the modifications may be applied to steps 1, 3, 9, and 21-22, and new steps may also be added.

As shown, in step 1, the UE may indicate that it wants to initiate service discovery in the registration request message, including providing information concerning the service capability(ies) for which the UE is requesting discovery (i.e., the criteria for discovery), for example, the UE may indicate the service capability ID, service type and/or service provider ID in the request to guide the service discovery. The UE may also include some or all of the information listed in Table 2. Moreover, the UE may further indicate that it wants the discovery process to include more than one aspect, for example, performing service discovery (e.g., smart transportation service) and network function discovery (e.g., network data analytics function (NWDAF)). The UE may also include the external ID it used in the service domain, i.e., the ID assigned within the service layer. This can be used to verify if the UE is allowed to discover or use a certain service capability—because when the service capability information is stored in the core network, the service provider may indicate that the service is open to some clients identified by the external ID. In addition, the UE may indicate if the service discovery result affects the operations during the registration—for example, if network slice selection depends on whether the desired service capability is discovered or not. The UE may also indicate what scope the UE wants applied to the service discovery that is performed, such as, for example, only NRF in the home PLMN, or NRF in both home and visiting PLMN if the UE is roaming. The UE may also indicate it wants to subscribe to a certain service capability at the NRF, with service capability information such as some or all of the information listed in Table 2. For example, with reference to the use case illustrated in the FIG. 11, a UE, such as UE1, may include the following information in the request to trigger the service discovery:

Service type: environment monitoring
Service capability ID: environment monitoring 123
Service provider ID: SP-abc
Service area: track areas xxx
Supported API: REST In step 2, an AMF function is selected to serve the UE.

In step 3, the service discovery related information in step 1 is sent from the RAN to the AMF.

In steps 4-5, the newly selected AMF contacts the old AMF to get the UE context information in case that the UE is served by a new AMF. That is, in the case that the UE is being served by a different AMF from the old AMF.

In steps 6-7, the new AMF gets the additional identity information from the UE.

In step 8, the AMF may decide to initiate UE authentication by invoking an AUSF.

In step 9, during the policy association, the AMF may query the UDM/UDR to determine whether the UE is allowed to trigger the service discovery or subscribe to certain service capabilities within the core network. The authorization could be specific to one service capability, for example, where the UE wants to discover device management and remote monitor services in a smart home application, and the policy could be made different as to whether the UE is allowed to discover each of the service capability.

In step 10, the new AMF notifies the old AMF that the registration of the UE in the new AMF is completed by invoking the Namf_Communication_RegistrationCompleteNotify service operation.

In step 11, the new AMF sends to the UE an Identity Request/Response (PEI).

In step 12, optionally the new AMF initiates an ME identity check by invoking the N5g-eir_EquipmentIdentityCheck_Get service operation.

In step 13, if step 14 is to be performed, the new AMF, based on the Subscription Permanent Identifier (SUPI), selects a UDM, and then the UDM may select a UDR instance.

In steps 14a-b, if the AMF has changed since the last Registration procedure, or if the UE provides a SUPI which doesn't refer to a valid context in the AMF, or if the UE registers to the same AMF it has already registered to for a non-3GPP access (i.e. the UE is registered over a non-3GPP access and initiates this Registration procedure to add a 3GPP access), the new AMF registers with the UDM using Nudm_UECM_Registration and subscribes to be notified when the UDM deregisters this AMF.

In step 14c, when the UDM stores the associated Access Type (e.g. 3GPP) together with the serving AMF as indicated in step 14a, it will cause the UDM to initiate a Nudm_UECM_DeregistrationNotification to the old AMF corresponding to the same (e.g. 3GPP) access, if one exists.

In step 14d, the Old AMF unsubscribes with the UDM for subscription data using Nudm_SDM_unsubscribe.

In step 15, if the AMF decides to initiate PCF communication, e.g., the AMF has not yet obtained an Access and Mobility policy for the UE or if the Access and Mobility policy in the AMF is no longer valid, the AMF selects a PCF.

In step 16, the new AMF performs a Policy Association Establishment.

In step 17, the PCF may invoke the Namf_EventExposure_Subscribe service operation for UE event subscription.

In step 18, the AMF may send to the SMF an Nsmf_PDUSession_UpdateSMContext ( ) message.

In step 19, the new AMF may send to the N3IWF an N2 AMF Mobility Request.

In step 20, the N3IWF may send to the new AMF an N2 AMF Mobility Response.

In steps 21-22, in the response to the UE, the AMF may include information, such as some or all of the information listed in Table 2, for any discovered service capabilities meeting the search criteria provided by the UE in its request. Alternatively, the AMF may indicate the successful subscription if the UE has requested to subscribe to certain service capabilities at the NRF. In this case, the AMF may include the subscription ID, notification target address, and NRF ID.

In an alternative embodiment, the core network may indicate, in the registration accept message that the service discovery functionality is available in the network slice that serves the UE—so that the UE may initiate the service discovery after the registration is done.

Note that a new step may be needed between the AMF and the NRF, after the AMF gets the authorization that the UE is allowed to request service discovery in the core network. This authorization process may be performed in step 9 and/or step 16, where the AMF may send the desired service capability information received from the UE to the NRF.

In the case that AMF re-allocation is required during the registration, as specified in section 4.2.2.2.3 of 3GPP TS 23.502, Procedures for the 5G System; Stage 2, v0.5.0, Release 15, similar information may be provided to enable the service discovery as discussed in the general registration procedure above.

Figure 16:
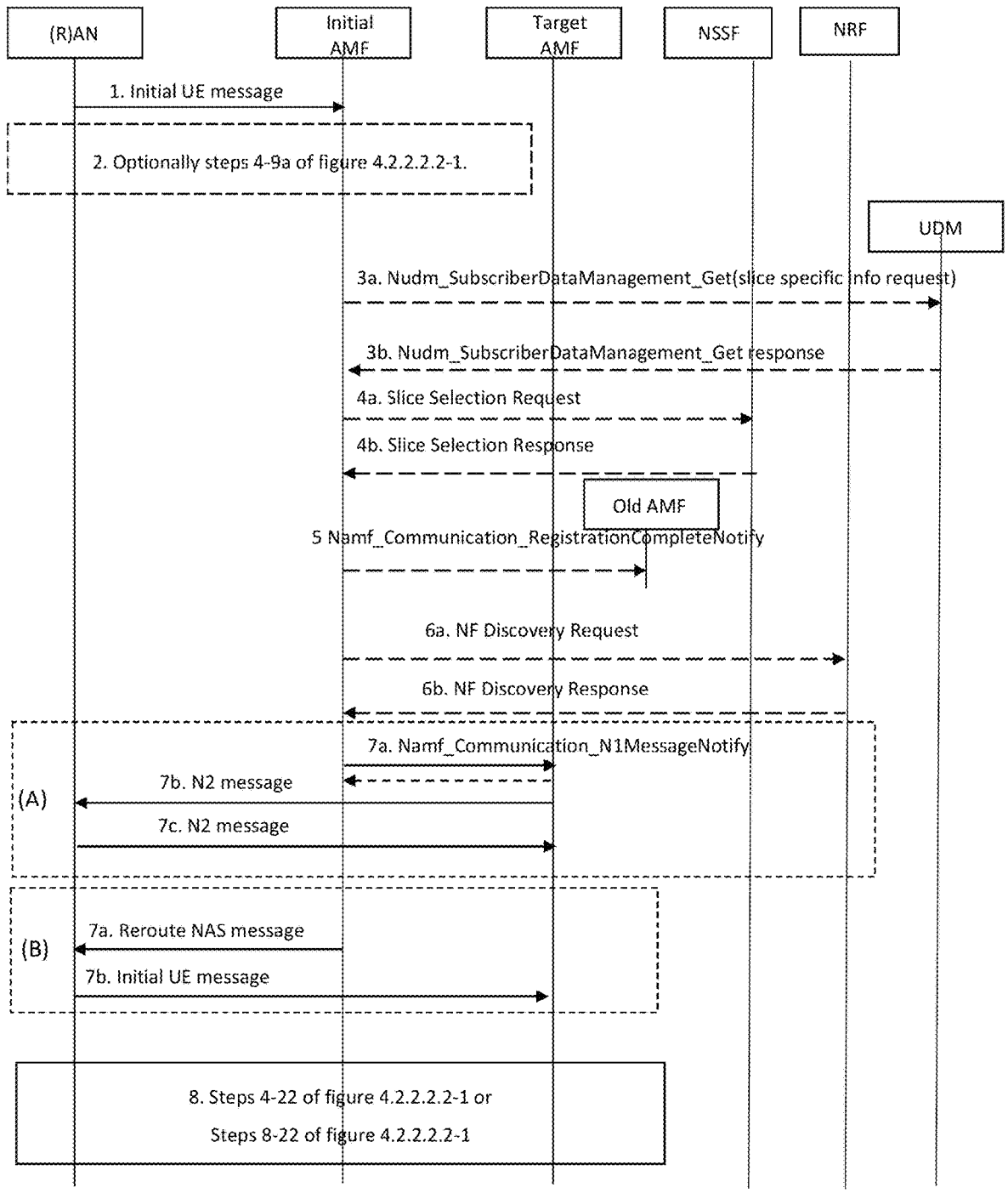
FIG. 16 is a call flow illustrating a method by which an AMF may insert service capability information and trigger service discovery using a NF discovery request message during a registration procedure which requires AMF reallocation.

FIG. 16 is a call flow illustrating how the AMF reallocation procedure of 3GPP TS 23.502, Procedures for the 5G System; Stage 2, v0.5.0, Release 15 may be modified to enable the AMF to insert the service capability information and trigger the service discovery process. Specifically, in one embodiment, the AMF may insert the service capability information and trigger the service discovery process in step 6a along with the NF discovery request message. Alternatively, the AMF may send a new separate service discovery request message to the NRF. In an embodiment, the NRF may be responsible for performing the service discovery process. The NRF may perform the search based on the search criteria information in the request message (i.e., some or all of the information listed in Table 2 for each desired service capability to be discovered), by comparing the search criteria to stored information relating to available service capabilities that have been advertised to or otherwise made known to the NRF. If any known service capabilities meet the search criteria, the NRF may then return, for each such service capability, information including, for example, an identifier of the provider of the service capability and information indicating an area in which the service is provisioned. The NRF may perform the service capability discovery together with NF discovery upon receiving the request from AMF. For the NF discovery, the NRF may perform the search based on registration information and subscription information of the UE. For example, based on the requested NF type or NF service, or registration area assigned to the UE, the NRF may identify an appropriate NF and include information concerning that NF in the discovery results provided in the response message. The NF discovery request and NF discovery process may be performed in accordance with the specifications of 3GPP TS 23.501 and TS 23.502.

Service Discovery as part of PDU Session Establishment

In accordance with another aspect, session establishment procedures may be modified to enable a UE to trigger Device/SCS/AS service discovery when initiating session establishment. In one embodiment, the service discovery process may be performed during SMF selection, which will be triggered as a sub-procedure of the session establishment procedure.

Figure 17:
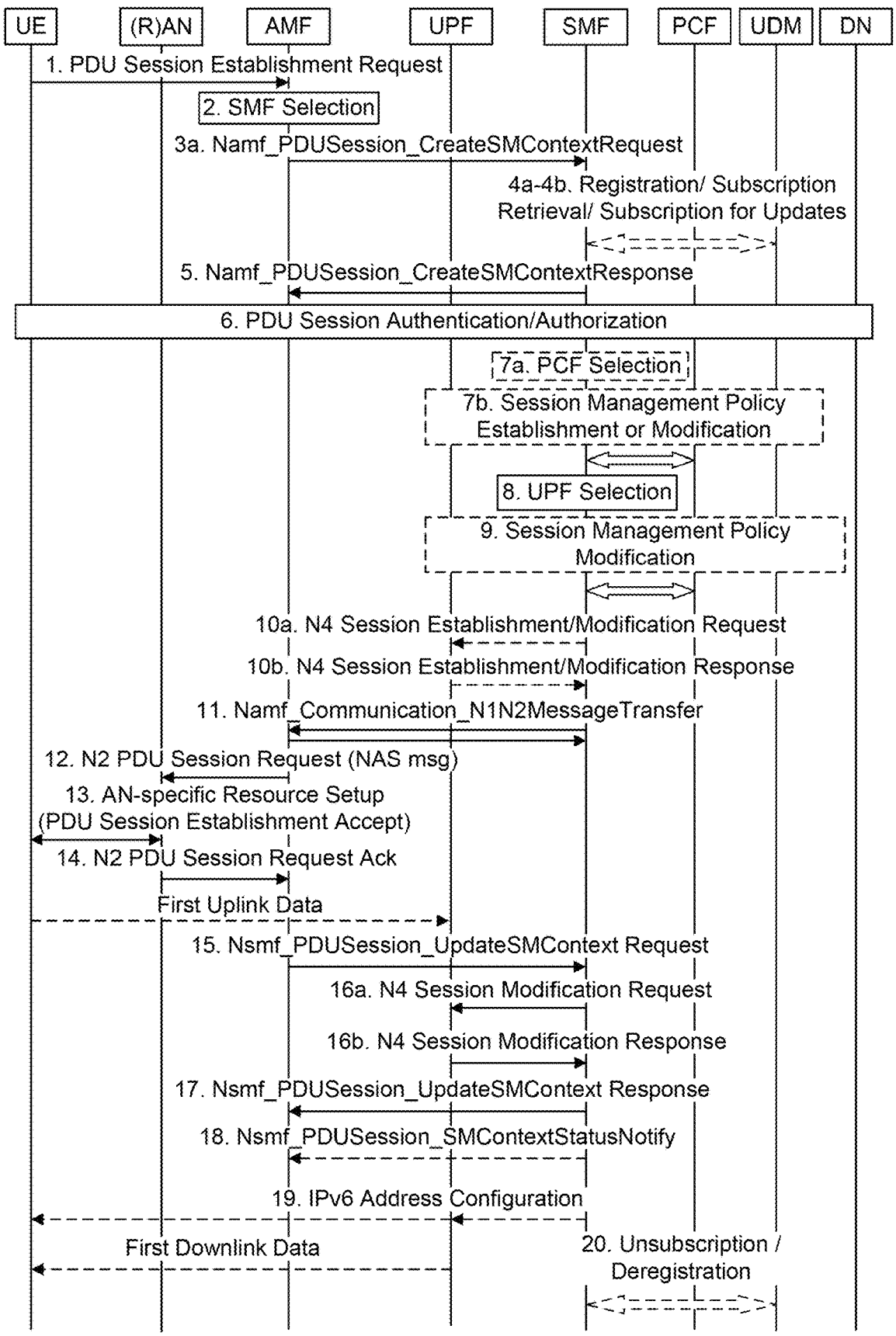
FIG. 17 is a call flow illustrating a UE-initiated PDU session establishment procedure modified to allow a UE to initiate service discovery during PDU session establishment.

FIG. 17 is a call flow illustrating a method by which a UE may initiate service discovery as part of a UE-initiated session establishment procedure, such as the PDU session establishment procedure defined in 3GPP TS 23.502, Procedures for the 5G System; Stage 2, v0.5.0, Release 15. FIG. 17 illustrates how the steps of the PDU session establishment procedure of 3GPP TS 23.502 may be modified to allow a UE to initiate the service discovery process along with the PDU session establishment procedure. In the example of FIG. 17, the modifications may be applied particularly to steps 1, 2, 3a, 4, 8, and 12-13.

As shown in FIG. 17, in step 1, a UE may indicate its desire to start a service discovery process before establishing a PDU session. This indication may be provided in a service discovery signal encapsulated within the NAS Mobility Management (MM) message as a payload. Thus, the service discovery information is carried within the NAS MM message (which is illustrated in FIG. 12).

As part of this signal, the UE may provide information related to the service capability it wants to discover (i.e., the criteria filter for discovery), such as some or all of the information listed in Table 2 for the desired service capability. In addition, the UE may include some or all of the following information:

The external ID of the UE in the service domain, i.e., the ID assigned within the service layer;

An indication whether the service discovery result will be considered in the SMF selection process;

An indication whether the service discovery is independent of the session establishment process, i.e., the discovery result will not affect the session establishment process;

Instead of specifying the destination DN to which the UE wants to connect, the UE may provide an indication that it expects the core network to determine the destination DN based on the service discovery results; in this case, the UE does not set the PDU type parameter;

In the case that the UE is trying to re-activate an existing session identified by the session ID, the UE may provide an indication to the core network whether a different DN found by the service discovery can be associated with the existing session; and An indication that the UE wants to subscribe to certain service capability(ies) at the NRF. For example, with reference to the use case illustrated in the FIG. 11, a UE, such as UE1, may include the following information in the request to trigger the service discovery:

Service type: environment monitoring

Service capability ID: environment monitoring 123

Service provider ID: SP-abc

Service area: track areas xxx

Supported API: REST

Figure 18:
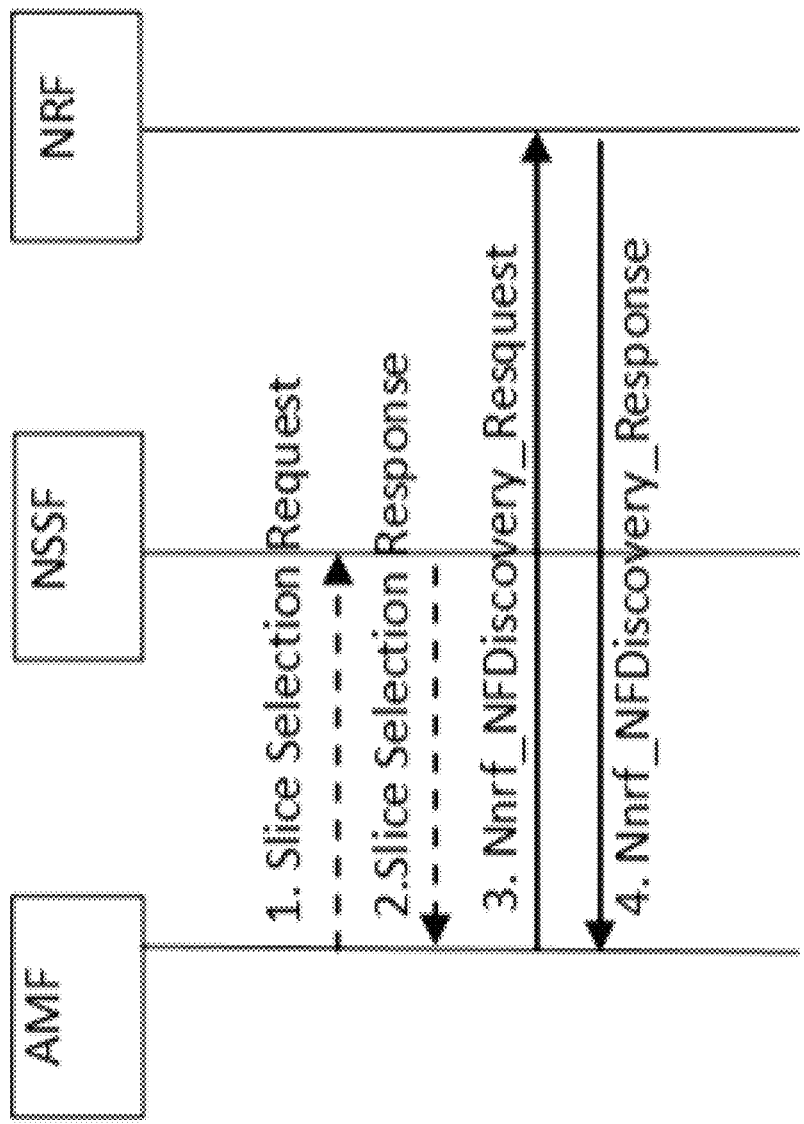
FIG. 18 is a call flow illustrating an SMF selection procedure modified to allow service discovery during SMF selection.

In step 2, during the SMF selection, the discovery process will be performed—the details of which are illustrated in FIG. 18 and are described below.

In step 3a, the AMF may include the address of DN resulting from the service discovery process in the message to the SMF, and may also indicate to the SMF that the DN is discovered by the NRF—and may be different from the original one specified by the UE. In addition, the AMF may include the service capability information in case that the SMF is selected based on the service discovery process.

In step 4, the SMF may update the UE's subscription/registration information by including the service capability information in case that the UE is using the service capability through the core network and the PDU session.

In step 5, the SMF may send to the AMF either an Nsmf_PDUSession_CreateSMContext Response (Cause, SM Context ID or N1 SM container (PDU Session Reject (Cause))) or an Nsmf_PDUSession_UpdateSMContext Response, depending on the request received in step 3a.

In step 6, optional secondary authorization/authentication may be performed.

In step 7a, if dynamic PCC is deployed, the SMF performs PCF selection.

In step 7b, the SMF may perform a Session Management Policy Establishment procedure to establish a PDU Session with the PCF and get the default PCC Rules for the PDU Session.

In step 8, if the PDU session type is not specified by the UE, and the DN is determined based on the service discovery process, the SMF decides the type of PDU session in this step and selects the UPF correspondingly.

In step 9, SMF may perform a Session Management Policy Modification procedure as defined in clause 4.16.5 to report some event to the PCF that has previously subscribed.

In step 10, if Request Type indicates "initial request", the SMF initiates an N4 Session Establishment procedure with the selected UPF, otherwise it initiates an N4 Session Modification procedure with the selected UPF.

In step 11, the SMF sends to the AMF a Namf_Communication_N1N2MessageTransfer message.

In steps 12-13, the AMF returns the results of the session establishment procedure and the service discovery results to the UE via the RAN. Particularly, the DN and PDU session type information are included if these are determined based on the service discovery process, and the service capability information as listed in Table 2 from service discovery process is also included.

In step 14, the (R)AN sends to the AMF an N2 PDU Session Response.

In step 15, the AMF sends to the SMF an Nsmf_PDUSession_UpdateSMContext Request (N2 SM information, Request Type). The AMF forwards the N2 SM information received from the (R)AN to the SMF.

In step 16a, the SMF initiates an N4 Session Modification procedure with the UPF. The SMF provides AN Tunnel Info to the UPF as well as the corresponding forwarding rules.

In step 16b, the UPF provides an N4 Session Modification Response to the SMF.

In step 17, the SMF sends to the AMF an Nsmf_PDUSession_UpdateSMContext Response (Cause).

In step 18, the SMF sends to the AMF an Nsmf_PDUSession_SMContextStatusNotify (Release).

In step 19, the SMF sends to the UE, via UPF, a router advertisement. Specifically, in the case of PDU Type IPv6 or IPv4v6, the SMF generates an IPv6 Router Advertisement and sends it to the UE via the N4 interface and the UPF.

In step 20, if the PDU Session establishment failed after step 4, the SMF shall (i) unsubscribe to the modifications of Session Management Subscription data for the corresponding (SUPI, DNN, S-NSSAI), using Nudm_SDM_Unsubscribe, if the SMF is no longer handling a PDU Session of the UE for this (DNN, S-NSSAI), and (ii) deregisters for the given PDU Session using Nudm_UECM_Deregistration (SUPI, DNN, PDU Session ID).

FIG. 18 is a call flow illustrating a method by which service discovery may be performed as part of the SMF selection procedure, such as the SMF selection procedure defined in 3GPP TS 23.502, Procedures for the 5G System; Stage 2, v0.5.0, Release 15. FIG. 18 illustrates how the steps of the SMF selection procedure of 3GPP TS 23.502 may be modified to allow service discovery during the SMF selection procedure. In the example of FIG. 18, the modifications may be applied particularly to steps 3 and 4.

After the slice selection request and response steps 1 and 2 of FIG. 18, in step 3 of FIG. 18 (as mentioned in step 1 of FIG. 17), the UE may indicate that it wants to initiate the service discovery process in the session establishment request message. The AMF may forward this indication to the NRF with the information for the service capability(ies) it wants to discover (i.e., the criteria for discovery), such as some or all of the information listed in Table 2 for each desired service capability. The NF discovery request sent from the AMF may be combined with the service capability discovery request, which indicates that the request covers both NF discovery as well as service discovery. The information included in the request message may come from the request from the UE (e.g., registration request in FIG. 15 and PDU session establishment request in FIG. 17) or the UE context information stored at the AMF. The NRF may perform both service capability discovery and NF discovery. For service capability discovery, the NRF may perform the search based on the information in the request message (i.e., some or all of the information listed in Table 2 for each desired service capability), by comparing the search criteria to stored information relating to available service capabilities that have been advertised to or otherwise made known to the NRF. If any known service capabilities meet the search criteria, the NRF may then return, for each such service capability, information including, for example, an identifier of the provider of the service capability and information indicating an area in which the service is provisioned. For the NF discovery, the NRF may perform the search based on registration information and subscription information of the UE. For example, based on the requested NF type or NF service, or registration area assigned to the UE, the NRF may identify an appropriate NF and include information concerning that NF in the discovery results provided in the response message. The NF discovery request and NF discovery process may be performed in accordance with the specifications of 3GPP TS 23.501 and TS 23.502.

In step 4 of FIG. 18, the NRF returns the results of the service capability discovery (and the NF discovery), indicating if the desired service capability(ies) or NFs are found or not. If such service capability(ies) or NFs are discovered and are available, information concerning each discovered service capability or NF is returned.

Alternatively, if the service discovery is independent of the session establishment process, i.e., the results will not affect any operation of establishing a PDU session, the AMF may initiate the service discovery at the NRF with new steps by using a new NRF service presented below. In case that the UE wants to subscribe to certain service capabilities at the NRF, the AMF may send a separate subscription request message to NRF also using the new NRF service presented below.

UE Subscription to Certain Service

Figure 19:
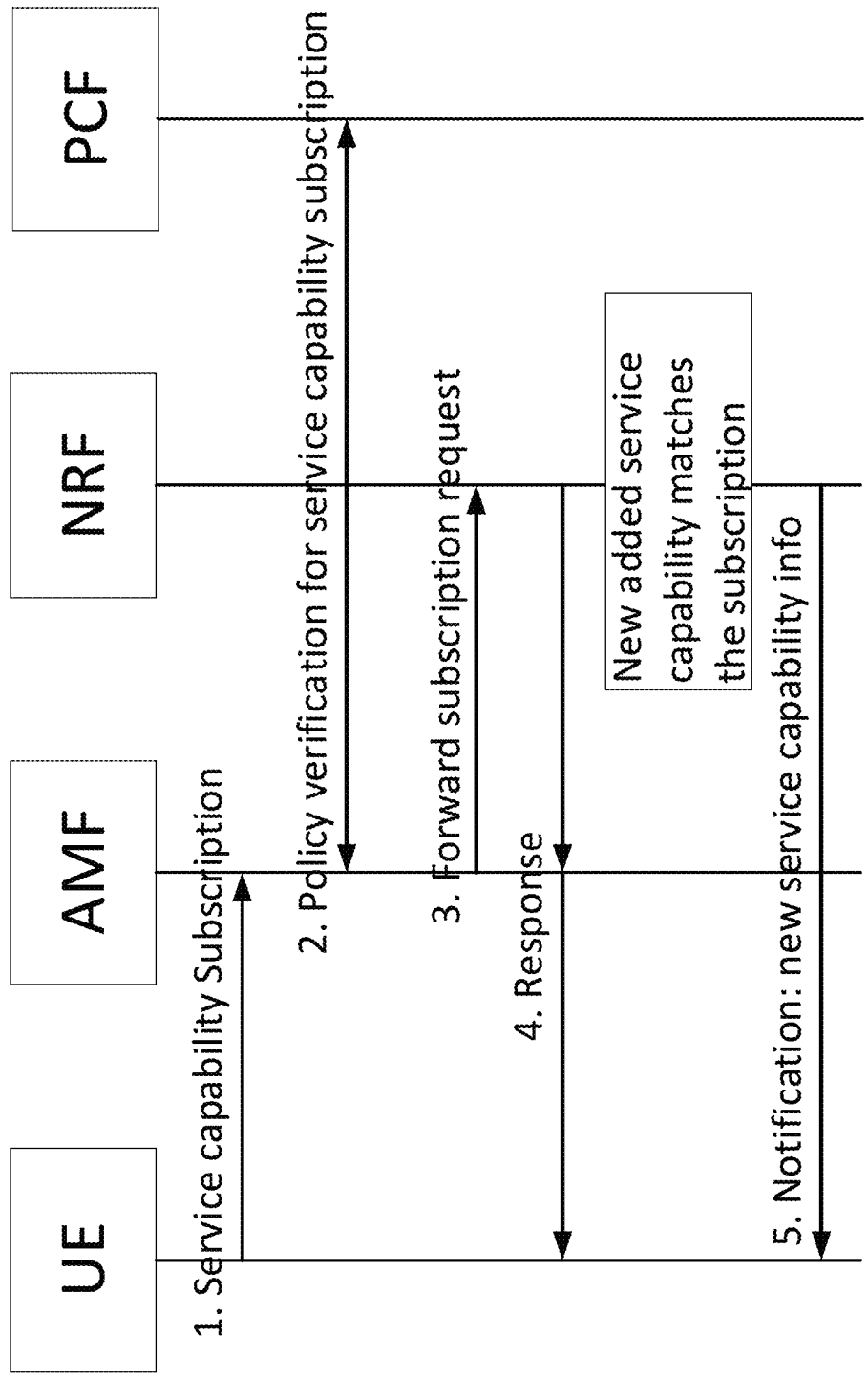
FIG. 19 is a call flow illustrating a method by which a UE may subscribe to receive notifications concerning certain Device/SCS/AS service capabilities.

In addition to a one-time request/response model for Device/SCS/AS service discovery, a UE may also subscribe to certain Device/SCS/AS service capabilities that are not available through the core network and get notified by the NRF once that service capability is available. That service capability may be provided by an application server or a device. FIG. 19 is a call flow illustrating one embodiment of a method by which a UE may subscribe to such Device/SCS/AS service capabilities.

As shown in FIG. 19, in step 1, the UE sends a subscription request to the AMF, indicating that it is interested in a certain service capability. In addition to some or all of the information listed in Table 2 for each desired service capability, the UE may also include the ID or address of the entity that is the notification target. It is possible that a different entity rather than the requesting UE may be the notification target. For example, the notification target may be a remote UE, an IoT device without a 3GPP subscription, or an application server (AS).

In step 2, the AMF contacts UDM/UDR to verify that the requesting UE and the notification target are allowed to use the service discovery service and receive the notification. In case that the notification target does not have a subscription or has not registered with the network yet, the network may set the requesting UE as the notification target. Alternatively, the AMF may contact the PCF for the verification process.

In step 3, after the verification is finished, the AMF may forward the subscription request to the NRF.

In step 4, the NRF sends a response to the UE via the AMF. A subscription ID may be included as the reference.

In step 5, when a new service capability is added at the NRF which matches the subscriber's interest (i.e., the criteria provided in the subscription request in step 1), the NRF may send out the notification, including the subscription ID and the ID of the entity (e.g., SCS/AS or UE) that provides the new service capability, along with some or all of the information listed in Table 2 for that service capability.

Application Server Initiated Service Discovery in the Core Network

As discussed in connection with the use case of FIG. 11, an application server may look for some devices that can provide certain application service data. According to an additional aspect disclosed herein, an application server may communicate with the NRF to perform such discovery in one of two ways: (1) by direct request to trigger the discovery process at the NRF, and (2) by creating a subscription at the NRF so that when some UEs advertise their service(s) and capability(ies) that match the interest of the application server, the NRF will send a notification to the SCS/AS.

Figure 20:
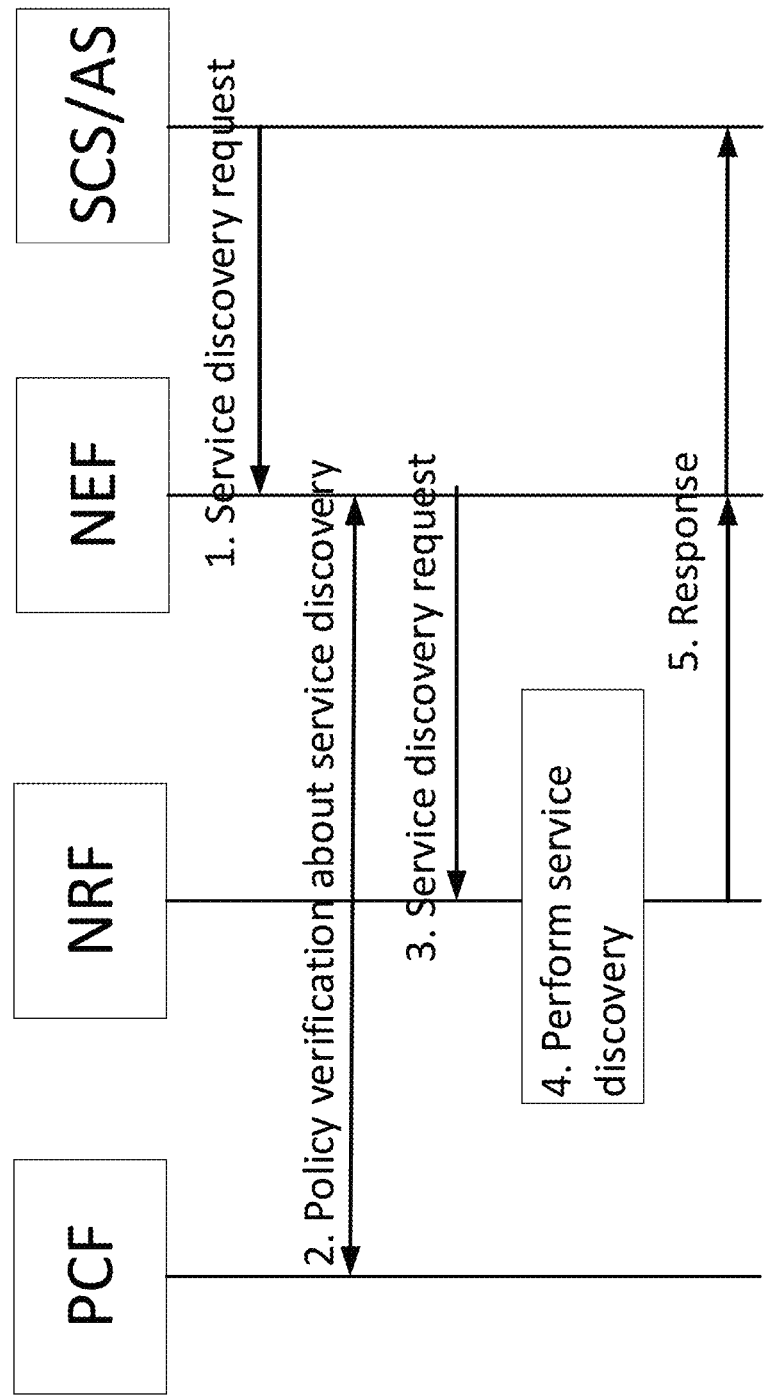
FIG. 20 is a call flow illustrating a method for SCS/AS-initiated service discovery in a core network.

FIG. 20 is a call flow illustrating one embodiment of a method of SCS/AS initiated service discovery in the network.

As shown, in step 1, the SCS/AS sends a service discovery request message to the NEF. In addition to providing, for each desired service capability, some or all of the service capability information listed in Table 2, the following information may be included:
- an indication of the type of devices for the service provider, such as for example, a UE, a cloud server, or a local server;
- an indication whether the SCS/AS wants to trigger the service discovery process or subscribe to a certain service capability notification; and
- Additional information that the SCS/AS may want to be returned, such as the address of the NRF performing the service discovery and the location (e.g., address of UDR/UDM) where the service capability information is stored.

In step 2, the NEF communicates with the PCF for authorization to determine if the SCS/AS is allowed to use the service discovery service and to discover the desired service capability.

In step 3, the NEF sends the service discovery request to the NRF.

In steps 4-5, the NRF performs the service discovery and returns the response.

It is understood that the entities performing the steps illustrated in FIGS. 12-20, such as the UE, AMF, UDR/UDSF, UDM/UDR, NRF, NEF, PCF, NFs, SCS/AS, (R)AN, SMF, AUSF, NSSF, DN, and the like, may be logical entities that may be implemented in the form of software (i.e., computer-executable instructions) stored in a memory of, and executing on a processor of, an apparatus configured for wireless and/or network communications or a computer system such as those illustrated in FIG. 2 or FIG. 7. That is, the method(s) illustrated in FIGS. 12-20 may be implemented in the form of software (i.e., computer-executable instructions) stored in a memory of an apparatus, such as the apparatus or computer system illustrated in FIG. 2 or FIG. 7, which computer executable instructions, when executed by a processor of the apparatus, perform the steps illustrated in FIGS. 12-20. It is also understood that the functionality illustrated in FIGS. 12-20 may implemented as a set of virtualized network functions. The network functions may not necessarily communicate directly, rather, they may communicate via forwarding or routing function. It is also understood that any transmitting and receiving steps illustrated in FIGS. 12-20 may be performed by communication circuitry of the apparatus under control of the processor of the apparatus and the computer-executable instructions (e.g., software) that it executes.

New NRF Services

Service Capability Management

In accordance with yet another aspect of the present disclosure, a new Network Repository Function (NRF) is disclosed—named Nnfr_ServiceCapabilityManagement—that functions to manage a Device/SCS/AS service capability (i.e., register, update or delete) within the core network. The service allows the NRF to manage the service capability information for UEs and SCS/ASs, and enables the service discovery in the core network. Table 3 describes the new NRF service. As an example of how the new service may be used, in step 3 of FIG. 13, the AMF could invoke the Nnrf_ServiceCapabilityManagement_ServiceCapabilityRegister operation to request the NRF to register a new service capability for the UE. Similarly, the NEF could invoke the same operation in step 3 of FIG. 14.

TABLE 3

"Device/SCS/AS Service Capability Management"
Service provided by NRF

| Service Name | Service Operations | Operation Semantics | Example Consumer(s) |
|---|---|---|---|
| Nnrf_ServiceCapabilityManagement | ServiceCapabilityRegister | Request/Response | AMF, NEF, SMF |
| | ServiceCapabilityUpdate | Request/Response | AMF, NEF, SMF |
| | ServiceCapabilityDeregister | Request/Response | AMF, NEF, SMF |

Service Capability Discovery

In accordance with yet another aspect of the present disclosure, a new Network Repository Function (NRF) is disclosed—named Nnrf_ServiceCapabilityDiscovery— that functions to enable Device/SCS/AS service discovery within the core network. In this embodiment, this new service performs service discovery at the NRF. Table 4 describes this new NRF service. As an example of how this new service may be used, in step 3 of FIG. 18, the AMF may invoke Nnrf_ServiceCapabilityDiscovery_ServiceCapabilityDiscovery to request the NRF to perform the service discovery process.

TABLE 3

"Device/SCS/AS Service Capability Discovery"
Service provided by NRF

| Service Name | Service Operations | Operation Semantics | Example Consumer(s) |
|---|---|---|---|
| Nnrf_ServiceCa- | ServiceCapabilityDis- | Request/ | AMF, SMF, |

TABLE 3-continued

"Device/SCS/AS Service Capability Discovery"
Service provided by NRF

| Service Name | Service Operations | Operation Semantics | Example Consumer(s) |
|---|---|---|---|
| pabilityDiscovery | covery | Response | NEF |
| | ServiceCapabilitySubscribe | Subscribe/ Notify | AMF, NEF, SMF |
| | ServiceCapabilityNotify | | AMF, NEF, SMF |
| | ServiceCapabilityUnSubscribe | | AMF, NEF, SMF |

User Interface

Figure 21:
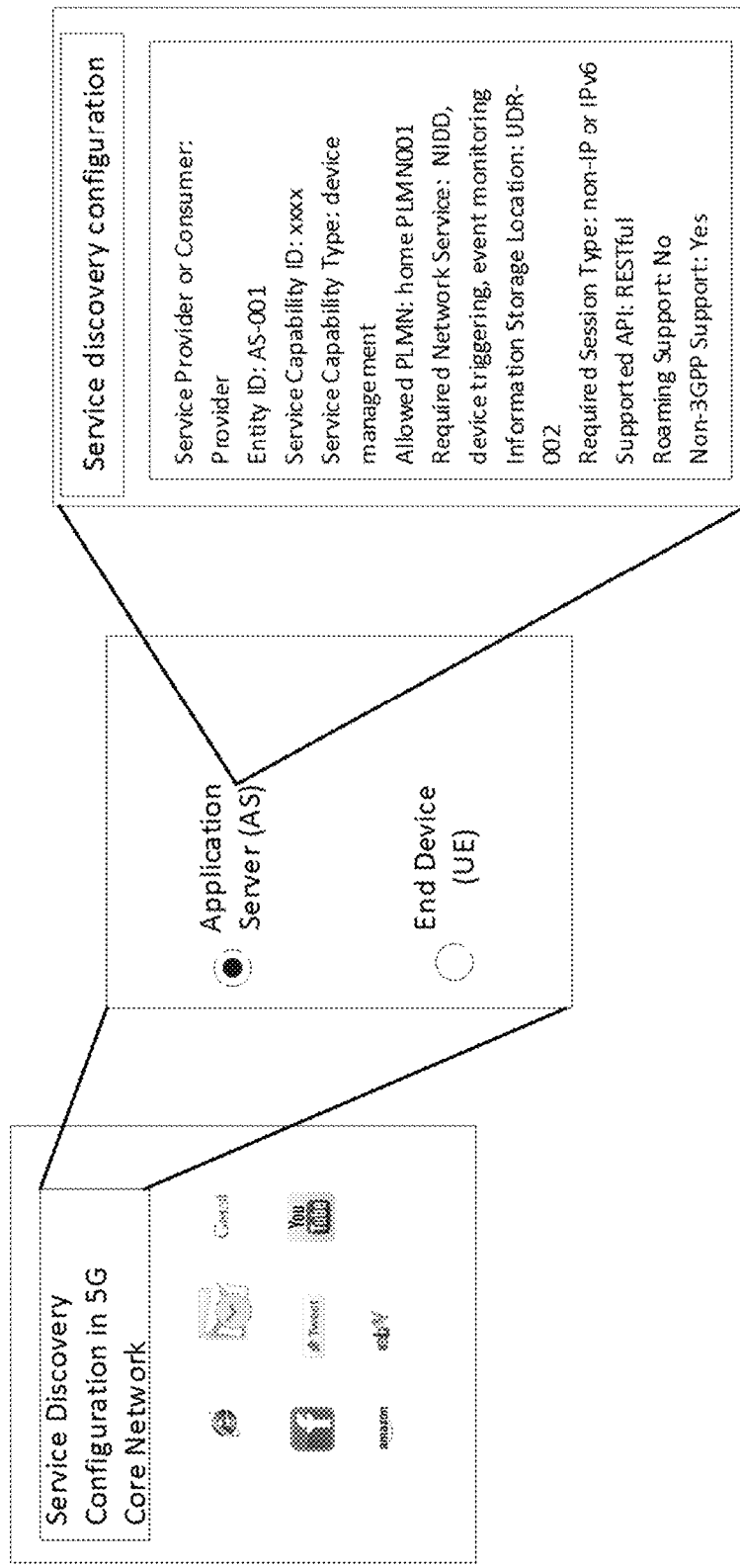
FIG. 21 is a diagram illustrating an example user interface for configuring service discovery in a communications network.

FIG. 21 shows an exemplary user interface that may be used to configure Device/SCS/AS service discovery in the 5G network. This user interface could be presented by and end device (such as a UE) or by a service application (SCS/AS), as the service provider or service consumer. For example, the user interface may be displayed on display 128 or 86 of FIGS. 2 and 7, respectively.

The illustrations of the aspects described herein are intended to provide a general understanding of the structure, function, and operation of the various aspects. The illustrations are not intended to serve as a complete description of all of the elements and features of apparatuses and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

The description of the aspects is provided to enable the making or use of the aspects. Various modifications to these aspects will be readily apparent, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A method comprising:
   receiving, by a network function (NF) of a core network and from a wireless transmit/receive unit (WTRU), a session establishment request, wherein the session establishment request comprises an indication that triggers a service discovery process;
   sending, by the NF and to a network repository function (NRF), a service capability discovery request based on the indication that triggers a service discovery process;
   receiving, by the NF and from the NRF, a service capability message in response to the service capability discovery request; and
   sending, by the NF and to the WTRU, a message comprising one or more service capabilities received in the service capability message in response to the session establishment request.

2. The method of claim 1, wherein the session establishment request comprises a protocol data unit (PDU) session establishment message.

3. The method of claim 1, wherein the indication that triggers the service discovery process comprises one or more service capability criteria.

4. The method of claim 1, wherein the service capability discovery request further comprises one or more criteria for service capabilities for the service discovery process.

5. The method of claim 4, wherein the one or more criteria for service capabilities comprise an indication of a type of network service associated with a service capability, an identifier of a service capability provider, an indication of a geographical area the WTRU is permitted to subscribe to a service capability, or a combination thereof.

6. The method of claim 1, wherein the message further comprises one or more restrictions associated with providing the one or more service capabilities, one or more requirements associated with providing the one or more service capabilities, or both.

7. The method of claim 1, wherein the service capability message comprises information indicative of one or more services provided by the core network.

8. The method of claim 1, wherein the message further comprises protocol data unit (PDU) session type information for establishing the requested session.

9. An apparatus implementing a Network Function (NF) of a core network, the apparatus comprising:
   a processor; and
   computer-executable instructions that, when executed by the processor, cause the apparatus to:
   receive, from a wireless transmit/receive unit (WTRU), a session establishment request, wherein the session establishment request comprises an indication that triggers a service discovery process;
   send, to a network repository function (NRF), a service capability discovery request based on the indication that triggers a service discovery process;
   receive, from the NRF, a service capability message in response to the service capability discovery request; and
   send, to the WTRU, a message comprising one or more service capabilities received in the service capability message in response to the session establishment request.

10. The apparatus of claim 9, wherein the session establishment request comprises a protocol data unit (PDU) session establishment message.

11. The apparatus of claim 9, wherein the indication that triggers the service discovery process comprises one or more service capability criteria.

12. The apparatus of claim 9, wherein the service capability discovery request further comprises one or more criteria for service capabilities for the service discovery process.

13. The apparatus of claim 12, wherein the one or more criteria for service capabilities comprise an indication of a type of network service associated with a service capability, an identifier of a service capability provider, an indication of a geographical area the WTRU is permitted to subscribe to a service capability, or a combination thereof.

14. The apparatus of claim 9, wherein the message further comprises one or more restrictions associated with providing the one or more service capabilities, one or more requirements associated with providing the one or more service capabilities, or both.

15. The apparatus of claim 9, wherein the service capability message comprises information indicative of one or more services provided by the core network.

16. The apparatus of claim 9, wherein the message further comprises protocol data unit (PDU) session type information for establishing the requested session.

17. A wireless transmit/receive unit (WTRU) comprising:

a processor configured to:
send, to a network function (NF), a session establishment request, wherein the session establishment request comprises an indication for triggering the NF to perform service discovery; and
receive, from the NF in response to the session establishment request, a message comprising one or more service capabilities, wherein the one or more services capabilities are retrieved by the NF from a network repository function (NRF) in response to a service capability discovery request sent by the NF based on the indication comprised in the session establishment request.

18. The WTRU of claim 17, wherein the session establishment request comprises a protocol data unit (PDU) session establishment request.

19. The WTRU of claim 17, wherein the indication for triggering the NF to perform service discovery comprises one or more service capability criteria.

20. The WTRU of claim 17, wherein the message received from the NF in response to the session establishment request further comprises one or more restrictions associated with providing the one or more service capabilities, one or more requirements associated with providing the one or more service capabilities, or both.

* * * * *